(12) United States Patent
Takagi et al.

(10) Patent No.: US 10,659,722 B2
(45) Date of Patent: May 19, 2020

(54) VIDEO SIGNAL RECEIVING APPARATUS AND VIDEO SIGNAL RECEIVING METHOD

(71) Applicant: RENESAS ELECTRONICS CORPORATION, Tokyo (JP)

(72) Inventors: Yuichi Takagi, Tokyo (JP); Ren Imaoka, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/410,603

(22) Filed: May 13, 2019

(65) Prior Publication Data

US 2019/0379859 A1  Dec. 12, 2019

(30) Foreign Application Priority Data

Jun. 7, 2018 (JP) .................................. 2018-109299

(51) Int. Cl.
*H04N 7/01* (2006.01)
(52) U.S. Cl.
CPC ......... *H04N 7/0102* (2013.01); *H04N 7/0122* (2013.01); *H04N 7/0142* (2013.01)
(58) Field of Classification Search
CPC .......................... H04N 21/4884; H04N 13/139
See application file for complete search history.

(56) References Cited

U.S. PATENT DOCUMENTS

| | | | | |
|---|---|---|---|---|
| 8,355,592 B1 * | 1/2013 | Shechtman | ........... | G06T 3/0093 345/419 |
| 9,154,813 B2 * | 10/2015 | Gilson | ............. | H04N 21/23434 |
| 9,936,208 B1 * | 4/2018 | Brailovskiy | ........... | H04N 19/42 |
| 10,110,775 B2 * | 10/2018 | Ishiguro | ............... | H04N 1/4097 |
| 2011/0181693 A1 * | 7/2011 | Lee | ....................... | H04N 19/597 348/43 |
| 2012/0198337 A1 * | 8/2012 | Flint | .................... | G11B 27/034 715/723 |
| 2012/0281905 A1 * | 11/2012 | Cheng | .................. | H04N 13/106 382/154 |
| 2016/0300595 A1 * | 10/2016 | Jeon | ...................... | G11B 27/034 |
| 2017/0013231 A1 * | 1/2017 | Kwon | .................. | H04N 7/0122 |
| 2019/0268072 A1 * | 8/2019 | Aoyama | ............ | H04B 10/1141 |

FOREIGN PATENT DOCUMENTS

JP  2010-251897 A  11/2010

* cited by examiner

*Primary Examiner* — Paulos M Natnael
(74) *Attorney, Agent, or Firm* — McDermott Will & Emery LLP

(57) ABSTRACT

A video signal receiving apparatus receives a first and second video signals for transmitting a same video content. When determining a size adjustment amount of a second video included in the second video signal, the video signal receiving apparatus performs scaling processing on a second image included in the second video signal to generate a scaling image and performs shift processing on the second image to generate a shift image. The video signal receiving apparatus calculates a similarity degree between a first image included in the first video signal and the scaling image, calculates a similarity degree between the first image and the shift image, and uses the scaling image or the shift image having the higher calculated similarity degree as an image to be subjected to the next scaling processing and the next shift processing.

18 Claims, 14 Drawing Sheets

FIG. 6

| | FIRST VIDEO DECODING IMAGE | SECOND VIDEO DECODING IMAGE | SECOND VIDEO OUTPUT EXAMPLE |
|---|---|---|---|
| [FIRST EXAMPLE] PERFORM REDUCTION PROCESSING ON SECOND VIDEO IN VERTICAL DIRECTION | 31a | 32a | 33a |
| [SECOND EXAMPLE] PERFORM ENLARGING PROCESSING ON SECOND VIDEO IN VERTICAL DIRECTION | 31b | 32b | 33b |
| [THIRD EXAMPLE] PERFORM REDUCTION PROCESSING ON SECOND VIDEO IN HORIZONTAL DIRECTION | 31c | 32c | 33c |
| [FOURTH EXAMPLE] PERFORM ENLARGING PROCESSING ON SECOND VIDEO IN HORIZONTAL DIRECTION | 31d | 32d | 33d |

VIDEO SIGNAL RECEIVING APPARATUS AND VIDEO SIGNAL RECEIVING METHOD

CROSS-REFERENCE TO RELATED APPLICATIONS

The disclosure of Japanese Patent Application No. 2018-109299 filed on Jun. 7, 2018 including the specification, drawings and abstract is incorporated herein by reference in its entirety.

BACKGROUND

The present invention relates to a video signal receiving apparatus and a video signal receiving method, and relates to, for example, a video signal receiving apparatus and a video signal receiving method capable of receiving the same video content with different video signals.

As one of transmission methods for transmitting a video signal, there is a transmission method for transmitting the same video content with different video signals. For example, in digital terrestrial television broadcasting in Japan, two video signals having different image quality and radio wave sensitivity (full-segment broadcasting and one-segment broadcasting) are transmitted. The full-segment broadcasting (hereinafter referred to as full-segment) has high resolution but low noise tolerance, and noise is generated in a video when the radio wave reception sensitivity is lowered. On the other hand, the one-segment broadcasting (hereinafter referred to as one-segment) has low resolution but high noise tolerance, and can be displayed at a constant level without depending on the radio wave reception sensitivity. Since the full-segment and the one-segment transmit the same video content (the same program), a mobile terminal such as a car navigation system performs switching between the full-segment and the one-segment in accordance with the radio wave reception sensitivity to display the video content with lower noise.

Japanese unexamined Patent Application publication No. 2010-251897 discloses a technique related to a receiving apparatus capable of appropriately correcting a misalignment of an image that may occur due to scaling.

SUMMARY

As described above, the mobile terminal such as car navigation system performs switching between the full-segment and the one-segment in accordance with the radio wave reception sensitivity to display the video content with lower noise. However, since an encoding method is different between the full-segment video and the one-segment video, a difference in video size (aspect ratio) or a misalignment in display position occurs between the full-segment video and the one-segment video. Therefore, when the full-segment and the one-segment are switched, there is a problem that a misalignment occurs in a video displayed on the display, and a user feels uncomfortable. In other words, when the same video content is received by different video signals, switching the video displayed on the display may cause the user to feel uncomfortable.

Other objects and new features will be apparent from the descriptions of the present specification and the accompanying drawings.

A video signal receiving apparatus according to an embodiment receives a first video signal for transmitting a same video content with a first aspect ratio and a second video signal for transmitting the same video content with a second aspect ratio different from the first aspect ratio. When determining a size adjustment amount of a second video included in the second video signal, the video signal receiving apparatus performs scaling processing on a second image included in the second video signal to generate a scaling image and performs shift processing on the second image to generate a shift image. The video signal receiving apparatus calculates a similarity degree between a first image included in the first video signal and the scaling image, calculates a similarity degree between the first image and the shift image, and uses the scaling image or the shift image having the higher calculated similarity degree as an image to be subjected to the next scaling processing and the next shift processing.

According to the one embodiment, when the same video content is received by different video signals, even if the video displayed on the display is switched, it is possible to suppress the user from feeling uncomfortable.

BRIEF DESCRIPTION OF THE DRAWINGS

FIG. 6 is a diagram for explaining a specific example of the image size determination processing.

DETAILED DESCRIPTION

First Embodiment

Figure 1:
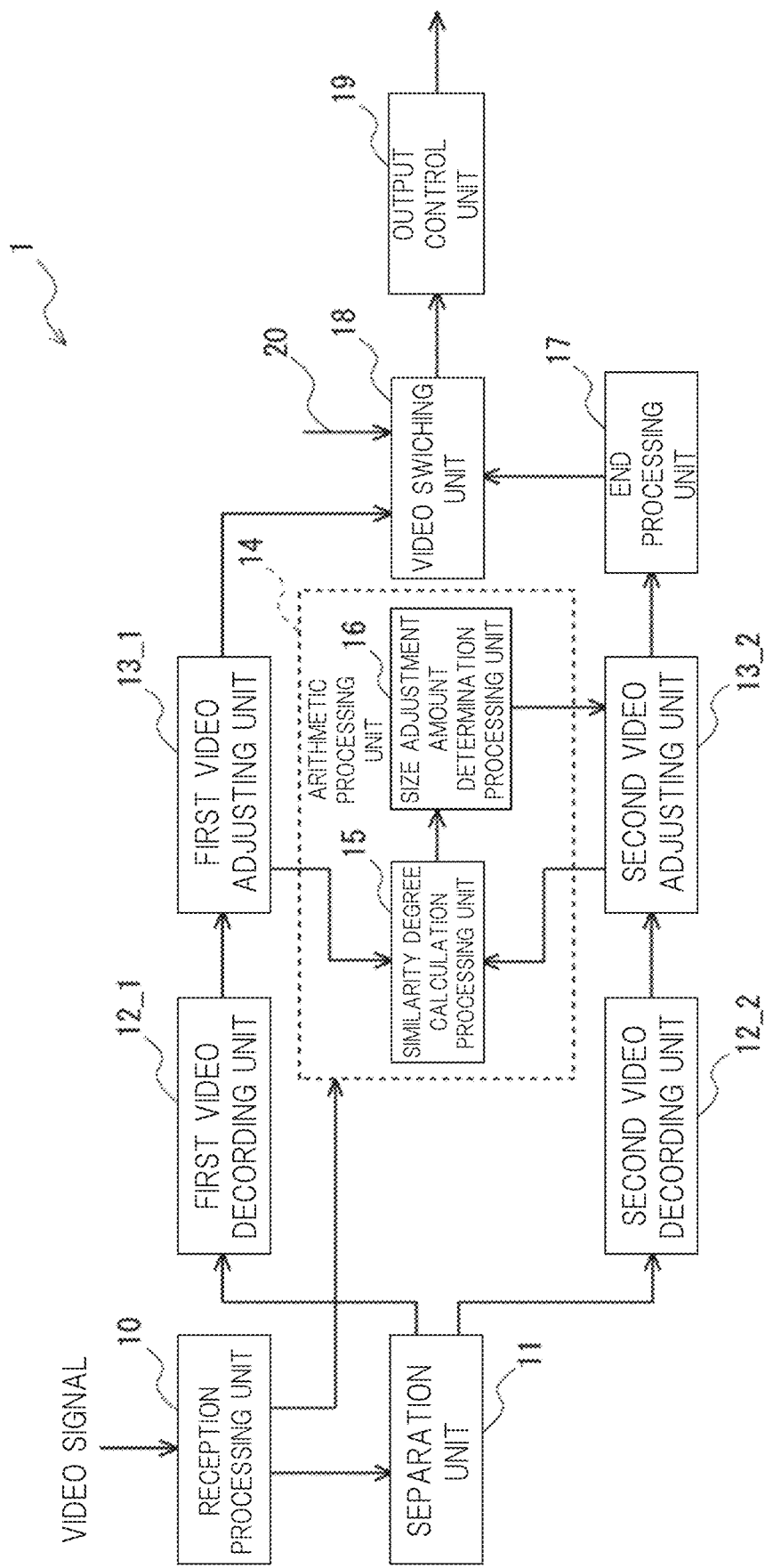
FIG. 1 is a block diagram for explaining a video signal receiving apparatus according to a first embodiment.

Hereinafter, a first embodiment will be described with reference to the accompanying drawings. FIG. 1 is a block diagram for explaining a video signal receiving apparatus according to the first embodiment. As illustrated in FIG. 1, the video signal receiving device 1 includes a reception processing unit 10, a separation unit 11, a first video decoding unit 12_1, a second video decoding unit 12_2, a first video adjusting unit 13_1, a second video adjusting unit 13_2, an arithmetic processing unit 14, an end processing unit 17, an video switching unit 18, and an output control unit 19. The arithmetic processing unit 14 includes a similarity degree calculation processing unit 15 and a size adjustment amount determination processing unit 16.

The reception processing unit 10 receives a video signal. The video signal includes a first video signal for transmitting the same video content with a first aspect ratio and a second video signal for transmitting the same video content with a second aspect ratio. For example, the video signal is a video signal of the digital terrestrial television broadcasting, and in this case, the first video signal is a full-segment video signal (high resolution) and the second video signal is a one-segment video signal (low resolution). The reception processing unit 10 outputs Transport Stream (TS) data to the separation unit 11. In addition, the reception processing unit 10 outputs a signal indicating that the video signal has been received to the arithmetic processing unit 14.

In the following description, the case where the video signal is a video signal of digital the terrestrial television broadcasting will be described as an example, but the video signal receiving apparatus 1 according to the present embodiment can be applied to video signals other than the digital terrestrial television broadcasting as long as the video signal includes a first video signal for transmitting the same video content with a first aspect ratio and a second video signal for transmitting the same video content with a second aspect ratio.

The separation unit 11 separates the first video signal and the second video signal included in the TS data supplied from the reception processing unit 10, and outputs the separated first video signal and the second video signal to the first video decoding unit 12_1 and the second video decoding unit 12_2, respectively.

The first video decoding unit 12_1 decodes the first video signal supplied from the separation unit 11. For example, the first video signal (full-segment) is a signal coded according to the MPEG-2 standard. In this instance, the first video decoder 12_1 is configured by a MPEG-2 decoder, and the first video signal is decoded using a MPEG-2 decoder. The decoded first video signal is supplied to the first video adjustment unit 13_1.

The second video decoding unit 12_2 decodes the second video signal supplied from the separation unit 11. For example, the second video signal (one-segment) is a signal coded according to the H.264 standard. In this case, the second video decoding unit 12_2 is configured by an H.264 decoder, and the second video signal is decoded using the H.264 decoder. The decoded second video signal is supplied to the second video adjustment unit 13_2.

In the present embodiment, the standards for encoding the first and second video signals may be reversed from the above examples, and standards other than the MPEG-2 standard and the H.264 standard may be used as the standards for encoding. In this case, decoders corresponding to the standards of the first and second video signals are provided in the first and second video decoding units 12_1 and 12_2, respectively.

The first video adjustment unit 13_1 adjusts a size of a first video included in the decoded first video signal to a display screen size. More specifically, the first video adjustment unit 13_1 adjusts the size of the first video to the display screen size by performing scaling processing of reducing or enlarging the first video and shift processing of shifting the first video in a horizontal direction or a vertical direction. Here, the display screen size corresponds to a size of a display for displaying the first video. The first video signal after the size adjustment is supplied to the video switching unit 18. In addition, a first image, which is a still image at a predetermined timing in the first video whose size is adjusted by the first video adjustment unit 13_1, is supplied to the similarity degree calculation processing unit 15 of the arithmetic processing unit 14.

The second video adjustment unit 13_2 adjusts a size of a second video included in the decoded second video signal. More specifically, the second video adjustment unit 13_2 adjusts the size of the second video by performing the scaling processing of reducing or enlarging the second video and the shift processing of shifting the second video in the horizontal direction or the vertical direction. At this time, in the first process, the second video adjustment unit 13_2 performs processing for adjusting the size of die second video to the display screen size, and outputs the adjusted second video to the similarity degree calculation processing unit 15. In the second and subsequent process, the second video adjustment unit 13_2 adjusts the size of the second video included in the second video signal in accordance with the result of a size adjustment amount determination processing (image size adjustment amount) in the arithmetic processing unit 14 (the size adjustment amount determination processing unit 16). The second video signal after the size adjustment is supplied to the video switching unit 18 via the end processing unit 17.

In addition, a second image, which is a still image at a predetermined timing in the second video whose size is adjusted by the second video adjustment unit 13_2, is supplied to the similarity degree calculation processing unit 15 of the arithmetic processing unit 14. Here, the first image supplied from the first video adjustment unit 13_1 to the similarity degree calculation processing unit 15 and the second image supplied from the second video adjustment unit 13_2 to the similarity degree calculation processing unit 15 are time-synchronized image data (i.e., image data at the same timing), and these are the same image.

The arithmetic processing unit 14 performs similarity degree calculation processing for calculating a similarity degree between the first image included in the first video signal and the second image included in the second video signal, and size adjustment amount determination processing for determining an image size adjustment amount of the second image included in the second video signal based on the similarity degree calculated in the similarity degree calculation processing. The similarity degree calculation processing is performed by the similarity degree calculation processing unit 15, and the size adjustment amount determination processing is performed by the size adjustment amount determination processing unit 16. For example, the arithmetic processing unit 14 starts the similarity degree calculation processing and the size adjustment amount determination processing at a timing when the signal indicating that the video signal has been received is received from the reception processing unit 10. For example, the signal indicating that the video signal has been received is supplied from the reception processing unit 10 to the arithmetic processing unit 14 at a timing of a start of reception of the video signal or at a timing of the switching of the program being viewed.

The arithmetic processing unit 14 determines the adjustment amount of the image size of the second image by repeating the similarity degree calculation processing and the size adjustment amount determination processing, and at this time, the arithmetic processing unit 14 adjusts the image size of the second image so that the similarity degree calculated in the similarity degree calculation processing becomes high. The details of the similarity degree calculation processing and the size adjustment amount determination processing in the arithmetic processing unit 14 will be described later. In this specification, "similarity degree calculation processing" and "size adjustment amount determination processing" are collectively referred to as "image size determination processing".

The edge processing unit 17 performs edge processing on the second image whose size has been adjusted by the second video adjustment unit 13_2. More specifically, when a margin region is generated between the display and the second video when the second video after the size adjustment is displayed on the display, the end processing unit 17 performs processing of interpolating the margin region. When a region outside the display region occurs when the second image after the size adjustment is displayed on the display, the end processing unit 17 performs processing of removing the region outside the display region. The second video signal processed by the end processing unit 17 is supplied to the video switching unit 18.

The video switching unit 18 receives the first video signal output from the first video adjusting unit 13_1 and the second video signal output from the end processing unit 17, and outputs one of the first video signal and the second video signal to the output control unit 19.

Here, the first video signal is the full-segment video signal, and the second video signal is the one-segment video signal. The full-segment video signal (first video signal) has a high resolution but has a low noise tolerance, and noise is generated in the video when the radio wave reception sensitivity is lowered. On the other hand, the one-segment video signal (second video signal) has low resolution but high noise tolerance, and can be displayed at a constant level without depending on the radio wave reception sensitivity. For example, the video switching unit 18 may switch an output video from the first video signal (full-segment) to the second video signal (one-segment) when the reception state (radio wave reception sensitivity) of the first video signal is worse than a predetermined standard while displaying the full-segment video (first video) on the display. For example, the video switching unit 18 may acquire information (denoted by reference numeral 20) on the reception state from the reception processing unit 10, and may switch between the first video signal (full-segment signal) and the second video signal (one-segment signal) based on the information on the reception state.

The video switching unit 18 may switch between the first video signal (full-segment signal) and the second video signal (one-segment signal) in response to a user input. In this case, a switching signal (denoted by reference numeral 20) is supplied from a user interface (not shown) to the video switching unit 18.

The output control unit 19 performs control for displaying the video signal supplied from the video switching unit 18 on the display.

Figure 2:
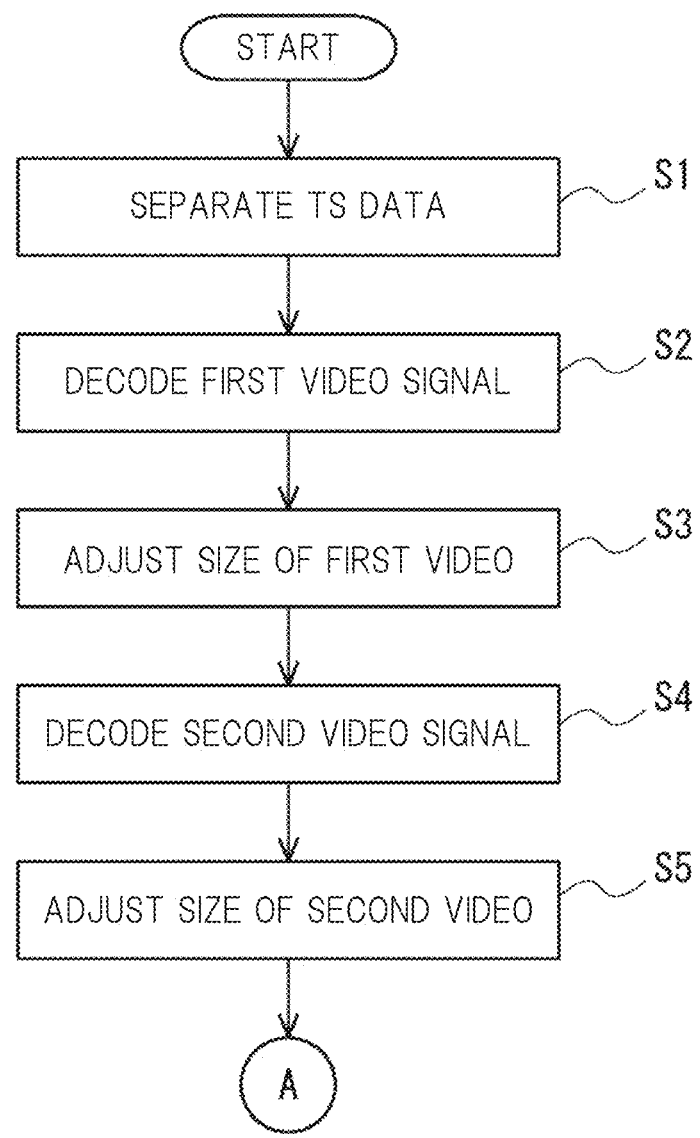
FIG. 2 is a flow chart for explaining an operation of the image signal receiving device according to the first embodiment.
Figure 3:
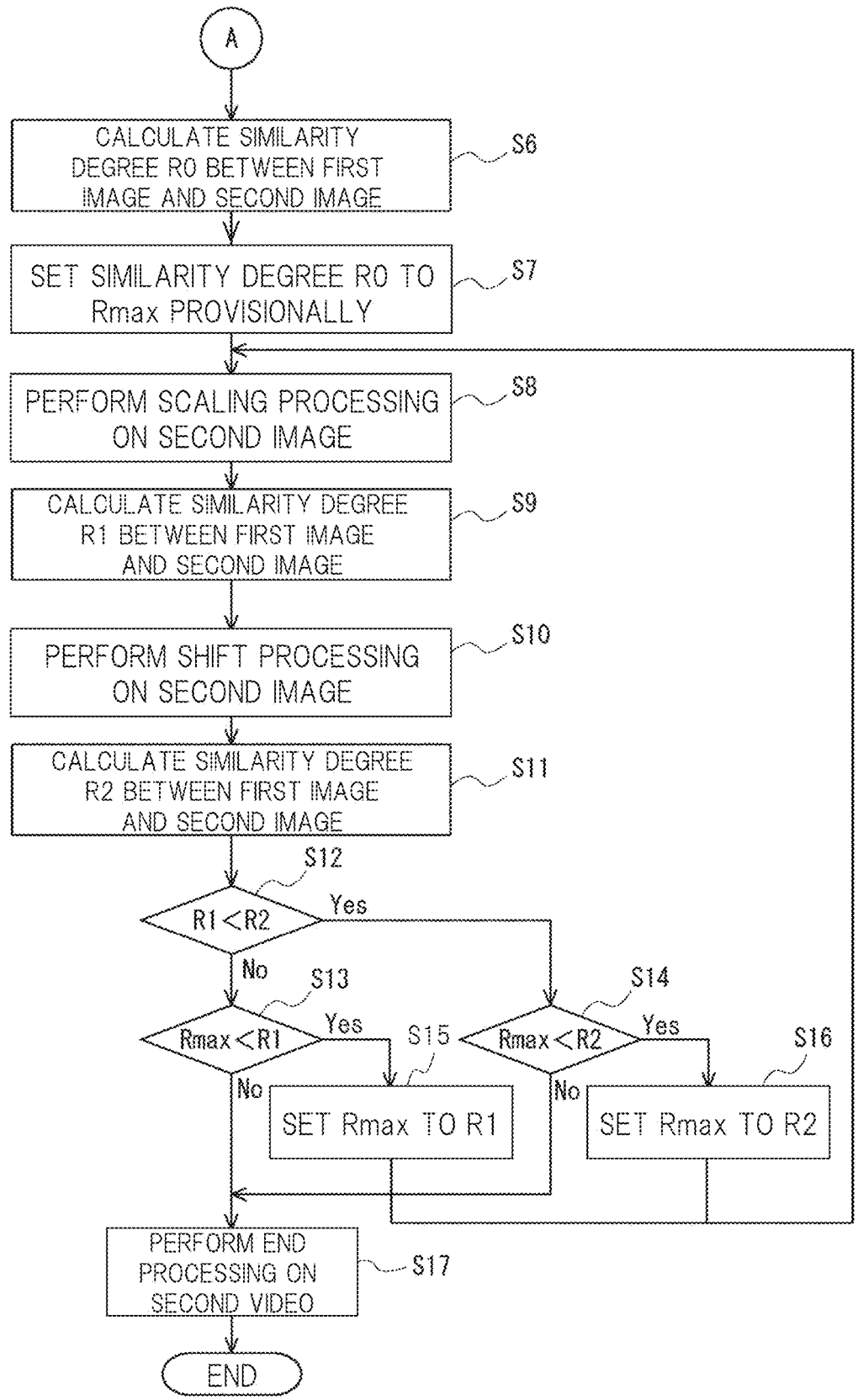
FIG. 3 is a flow chart for explaining the operation of the image signal receiving device according to the first embodiment.

Next, the operation of the video signal receiving apparatus according to the present embodiment, i.e., the video signal receiving method, will be described. FIGS. 2 and 3 are flowcharts for explaining the operation of the video signal receiving apparatus according to the present embodiment.

When the video signal (TS data) is supplied to the reception processing unit 10 shown in FIG. 1, the reception processing unit 10 supplies the supplied video signal to the separation unit 11. The separation unit 11 separates the first and second video signals included in the TS data supplied from the reception processing unit 10, and outputs the separated first and second video signals to the first video decoding unit 12_1 and the second video decoding unit 12_2, respectively (step S1 of FIG. 2).

Next, the first video decoding unit 12_1 decodes the first video signal supplied from the separation unit 11 (step S2). Thereafter, the first video adjustment unit 13_1 adjusts (normalizes) the size of the first video included in the decoded first video signal to the display screen size (step S3). At this time, the first video adjustment unit 13_1 supplies a first image, which is still image at a predetermined timing in the first video whose size has been adjusted by the first video adjustment unit 13_1 to the similarity degree calculation processing unit 15.

The second video decoding unit 12_2 decodes the second video signal supplied from the separation unit 11 (step S4). Thereafter, the second video adjustment unit 13_2 adjusts (normalizes) the size of the second video included in the decoded second video signal to the display screen size (step S5). At this time, the second video adjustment unit 13_2 supplies a second image, which is a still image at a predetermined timing in the second video whose size has been adjusted by the second video adjustment unit 13_2 to the similarity degree calculation processing unit 15.

Here, the first image supplied from the first video adjustment unit 13_1 to the similarity degree calculation processing unit 15 and the second image supplied from the second video adjustment unit 13_2 to the similarity degree calculation processing unit 15 are time-synchronized image data (i.e., image data at the same timing), and these are the same image. The order of steps S2 to S5 is not limited to this order.

The first image and the second image supplied to the similarity degree calculation processing unit 15 are image data from which color difference information has been removed by the first video adjustment unit 13_1 and the second video adjustment unit 13_2, and in this case, a luminance value in each pixel of the first image and a luminance value in each pixel of the second image are supplied to the similarity degree calculation processing unit 15. In this manner, by using the luminance value of the first image and the luminance value of the second image, the calculation amount in the similarity degree calculation processing described later can be reduced. In addition, since human vision is more sensitive to luminance than color difference, it is preferable to use a luminance value. On the other hand, in the present embodiment, the color difference information may be used in addition to the luminance value in order to improve the calculation accuracy of the similarity degree calculation processing. Alternatively, the color difference information may be used without using the luminance value. That is, the user can arbitrarily determine the pixel data (luminance value and color difference information) used in the similarity degree calculation processing in consideration of the calculation amount and the calculation accuracy.

Next, the similarity degree calculation processing unit 15 calculates the similarity degree R0 between the first image supplied from the first video adjustment unit 13_1 and the second image supplied from the second video adjustment unit 13_2 (step S6 of FIG. 3). At this time, the similarity degree calculation processing unit 15 calculates the similarity degree using a pixel value at each coordinate of the first image and a pixel value of the second image at the coordinate corresponding to each coordinate of the first image. As described above, for example, the pixel value of the first image is the luminance value of the first image, and the pixel value of the second image is the luminance value of the second image. Hereinafter, the similarity degree calculation processing will be described in detail.

Figure 4:
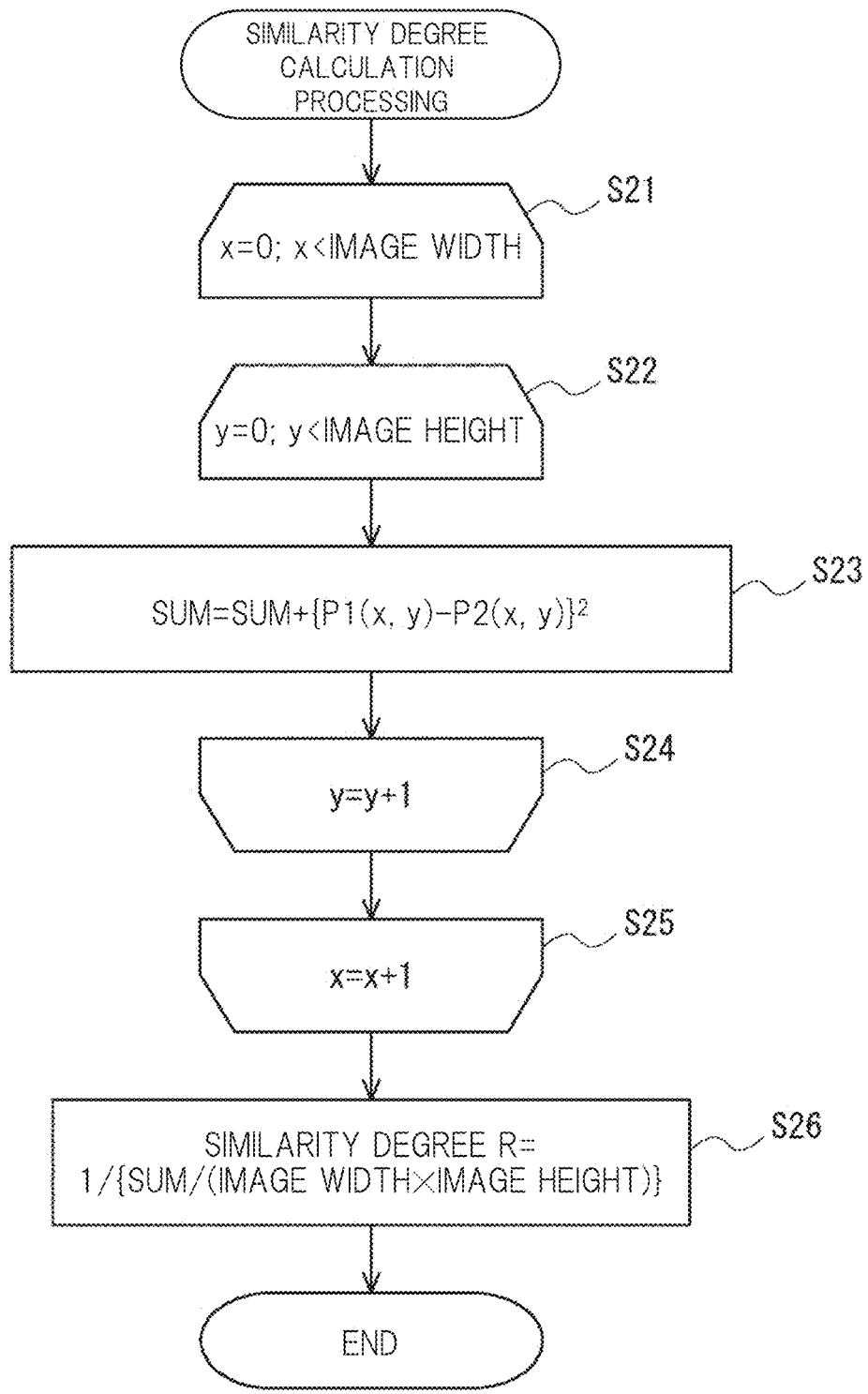
FIG. 4 is a flow chart for explaining similarity degree calculation processing.

FIG. 4 is a flowchart for explaining the similarity degree calculation processing. Steps S21 and S25 shown in the flowchart of FIG. 4 show a loop process of repeating a process of increasing a value of x by 1 in the extent of "0≤x<image width". Steps S22 and S24 represent a loop process of repeating a process of increasing a value of y by 1 in the range of "0≤y<image height". Further, step S23 represents a process of adding the square of the difference between the pixel value P1(x, y) at the coordinates (x, y) of the first image and the pixel value P2(x, y) at the coordinates (x, y) of the second image for each loop process (that is, sum=sum+{P1(x, y)−P2(x, y)}$^2$).

In the flow chart shown in FIG. 4, sum=sum+{P1 (0, 0)−P2 (0, 0)}$^2$ is obtained for the coordinates (0, 0) of the first and second images in the first looping process. In the subsequent looping process (steps S22 to S24), sum=sum+{P1 (0, 1)−P2 (0, 1)}$^2$ is obtained for the coordinates (0, 1) of the first and second images. In the subsequent looping process (steps S22 to S24), sum=sum+{P1 (0, 2)−P2 (0, 2)}$^2$ is obtained for the coordinates (0, 2) of the first and second images. By repeating such process, the sum of the square of differences between the pixel values P1(x, y) at the coordinates (x, y) of the first image and the pixel values P2(x, y) at the coordinates (x, y) of the second image can be obtained at the respective coordinates (x, y).

Thereafter, the similarity degree R can be obtained by calculating the similarity degree R=1/{sum/(image width×image height)} with respect to the value sum obtained in steps S21 to S25 (step S26). That is, "sum/(image width×image height)" indicates a mean square error, and the similarity degree R can be calculated by obtaining the reciprocal of the mean square error.

Here, the "image width" and the "image height" correspond to the image width and the image height of the region of the first image and the second image used in the similarity degree calculation processing. In other words, in the similarity degree calculation processing, the similarity degree is calculated for the overlapping portion of the first image and the second image, and the "image width" and the "image height" correspond to the image width and the image height of the region where the first image and the second image overlap. The regions (image width and image height) of the first image and the second image used in the similarity degree calculation processing can be arbitrarily determined. The image width and the image height of the first image and the image width and the image height of the second image are respectively the same.

The similarity degree R indicates a degree of similarity between the first image and the second image, and the higher the value of the similarity degree R, the more similar the first image and the second image are. That is, when the first image and the second image are similar to each other, since the pixel value P1(x, y) of the first image and the pixel value P2(x, y) of the second image are approximate to each other at each coordinate, the value of sum=sum+{P1(x, y)−P2(x, y)}$^2$ becomes small. Therefore, in this case, the value of the similarity degree R=1/{sum/(image width×image height)} becomes large.

Conversely, when the first image and the second image are not similar to each other, since the pixel value P1(x, y) of the first image and the pixel value P2(x, y) of the second image are not approximate to each other at each coordinate, the value of sum=sum+{P1(x, y)−P2(x, y)}$^2$ becomes large.

Therefore, in this case, the value of the similarity degree R=1/{sum/(image width×image height)} becomes small.

Next, as shown in the flow chart of FIG. 3, the similarity degree R0 calculated in step S6 is provisionally set to the largest similarity degree Rmax (step S7).

Thereafter, the size adjustment amount determination processing unit 16 performs the scaling processing on the second image (step S8). Specifically, the size adjustment amount determination processing unit 16 performs the scaling processing on the second image using the second video adjustment unit 13_2. At this time, the size adjustment amount determination processing unit 16 outputs a command for executing the scaling processing to the second video adjustment unit 13_2. The second video adjustment unit 13_2 performs the scaling processing on the second image in response to the command from the size adjustment amount determination processing unit 16. The second image (original image) to be subjected to the scaling processing at this time is the second image used when the similarity degree R0 is calculated in step S6.

The second video adjustment unit 13_2 performs the scaling processing by, for example, reducing the second image by one in the vertical direction. Thereafter, the second video adjustment unit 13_2 outputs the scaled second image to the similarity degree calculation processing unit 15. The similarity degree calculation processing unit 15 calculates the similarity degree R1 between the first image and the scaled second image (step S9). Since the process of calculating the similarity degree R1 is the same as that described in step S6, a duplicated description thereof will be omitted.

Next, the size adjustment amount determination processing unit 16 performs the shift processing on the second image (step S10). Specifically, the size adjustment amount determination processing unit 16 performs the shift processing on the second image using the second video adjustment unit 13_2. At this time, the size adjustment amount determination processing unit 16 outputs, to the second video adjustment unit 13_2, a command for performing the shift processing on the second image. The second video adjustment unit 13_2 performs the shift processing on the second image in response to the command from the size adjustment amount determination processing unit 16. The second image to be shifted at this time is the second image used when the similarity degree R0 is calculated in step S6. That is, in the present embodiment, the scaling processing (step S8) and the shift processing (step S10) are respectively performed on the second image used when the similarity degree R0 is calculated in step S6.

The second video adjustment unit 13_2 shifts the second image by one line in the vertical direction, for example, to perform the shift processing. Thereafter, the second video adjustment unit 13_2 outputs the shifted second image to the similarity degree calculation processing unit 15. The similarity degree calculation processing unit 15 calculates the similarity degree R2 between the first image and the shifted second image (step S11). Since the process of calculating the similarity degree R2 is the same as that described in step S6, a duplicated description thereof will be omitted.

Thereafter, the size adjustment amount determination processing unit 16 compares the similarity degree R1 calculated in step S9 with the similarity degree R2 calculated in step S11 (step S12). When the similarity degree R1 is larger than the similarity degree R2 (step S12: NO), the maximum value Rmax of the similarity degree set in step S7 is compared with the similarity degree R1 (step S13). As a result, when the similarity degree R1 is larger than the maximum value Rmax of the similarity degree set in step S7

(step S13: YES), the maximum value Rmax of the similarity degree is set (updated) to the value of the similarity degree R1 (step S15). Thereafter, the processes of steps S8 to S16 are repeated. When repeating the processing of the next steps S8 to S16, the second image (the second image used for calculating the similarity degree R1) subjected to the scaling processing in the current step S8 is used as the second image (reference image) for performing the next scaling processing and the next shift processing.

On the other hand, when the similarity degree R1 is smaller than the similarity degree R2 (step S12: YES), the maximum value Rmax of the similarity degree set in step S7 is compared with the similarity degree R2 (step S14). As a result, when the similarity degree R2 is larger than the maximum value Rmax of the similarity degree set in step S7 (step S14: YES), the maximum value Rmax of the similarity degree is set (updated) to the value of the similarity degree R2 (step S16). Thereafter, the processes of steps S8 to S16 are repeated. When the processing of the next steps S8 to S16 is repeated, the second image (the second image used for calculating the similarity degree R2) subjected to the shift processing in the present step S10 is used as the second image (the reference image) for performing the next scaling processing and the next shift processing.

That is, in the video signal receiving apparatus according to the present embodiment, the similarity degree R1 between the scaling image subjected to the scaling processing on the second image and the first image is calculated, the similarity degree R2 between the shift image subjected to the shift processing on the second image and the first image is calculated, and the scaling image or the shift image having the higher calculated similarity degree is used as an image (reference image) to be subjected to the next scaling processing and the next shift processing.

Figure 5:
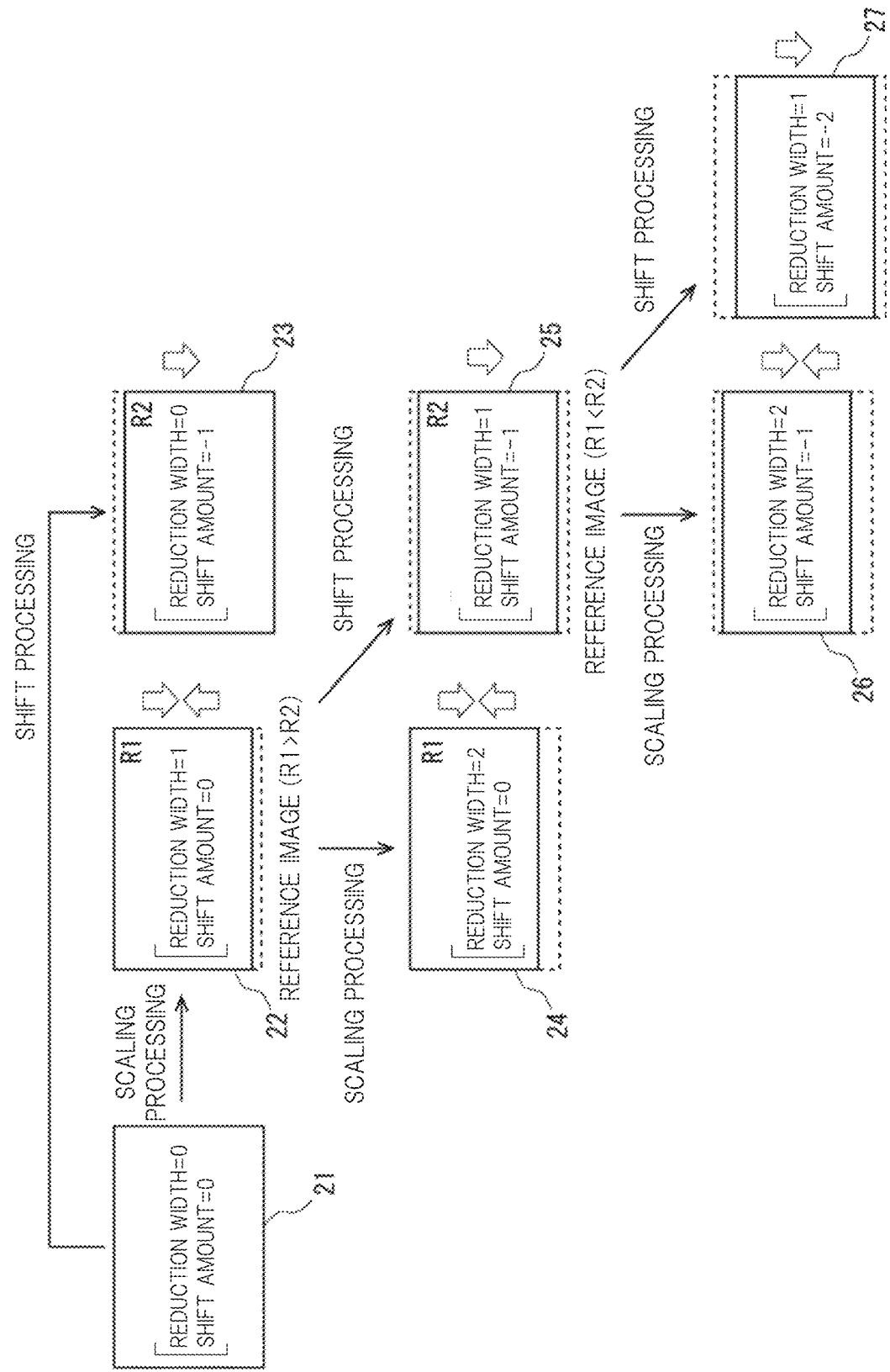
FIG. 5 is a diagram for explaining a flow of image size determination processing.

FIG. 5 is a diagram for explaining a flow of image size determination processing in the video signal receiving apparatus according to the present embodiment. The second image 21 of FIG. 5 shows an initial second image (reduction width=0, shift amount=0). The second image 21 corresponds to the second image when the similarity degree R0 is calculated in step S6. In the present embodiment, first, in the first flow, the scaling processing (step S8) and the shift processing (step S10) are performed on the second image 21.

That is, when the scaling processing (step S8) is performed with respect to the second image 21 as shown in FIG. 5, the process of reducing the second image 21 by one line in the vertical direction is performed. In other words, the second image 21 is reduced in the vertical direction at a reduction rate such that the image height of the second image 21 is reduced by one line. By reducing the second image 21, the aspect ratio of the second image 21 is changed. Thereafter, the upper end of the reduced image is aligned with the upper end in the vertical direction. In the example shown in FIG. 5, the second image 22 subjected to the scaling processing for the second image 21 is reduced by one line upward in the vertical direction (reduction width=1, shift amount=0). The upper end of the second image 22 after the scaling processing is aligned.

When the shift processing (step S10) is performed on the second image 21, the second image 21 is translated by one line to the lower side in the vertical direction without changing the aspect ratio of the second image 21. In the example shown in FIG. 5, the second image 23 subjected to the shift processing with respect to the second image 21 is shifted downward by one line in the vertical direction (reduction width=0, shift amount=1).

Thereafter, in step S9, the similarity degree R1 between the first image and the scaled second image 22 is calculated. In step S11, the similarity degree R2 between the first image and the shifted second image 23 is calculated. Among the second image (scaling image) 22 and the second image (shift image) 23, the image having the higher calculated similarity (R1 or R2) is used as the image (reference image) to be subjected to the next scaling processing and the next shift processing. In the example shown in FIG. 5, since the similarity degree R1 of the second image (scaling image) 22 is larger than the similarity degree R2 of the second image (shifting image) 23, the second image 22 becomes a reference image for performing the next scaling processing and the next shift processing.

In the next flow (that is, in the second steps S8 to S16), the scaling processing and the shift processing are performed on the second image 22. That is, as shown in FIG. 5, the second image 22, which is a new reference image, is reduced by one line in the vertical direction, and thereafter, the upper end of the image is aligned with the upper end in the vertical direction, thereby performing the scaling processing (step S8). The reduction width and the shift amount of the second image 24 after the scaling processing has been performed on the second image 22, that is, the total reduction width and the shift amount from the second image 21 are the reduction width=2 and the shift amount=0.

In addition, the second image 22, which is a new reference image, is translated one line downward in the vertical direction to perform the shift processing (step S10). The reduction width and the shift amount of the second image 25 after the shift processing has been performed on the second image 22, that is, the total reduction width and the shift amount from the second image 21, are the reduction width=1 and the shift amount=−1.

Thereafter, in step S9, the similarity degree R1 between the first image and the scaled second image 24 is calculated. In step S11, the similarity degree R2 between the first image and the shifted second image 25 is calculated. Among the second image (scaling image) 24 and the second image (shift image) 25, the image having the higher calculated similarity (R1 or R2) is used for the image (reference image) to be subjected to the next scaling processing and the next shift processing. In the example shown in FIG. 5, since the similarity degree R2 of the second image (shift image) 25 is larger than the similarity degree R1 of the second image (scaling image) 24, the second image (shift image) 25 becomes a reference image for performing the next scaling processing and the next shift processing.

Then, in the next flow (that is, in the third steps S8 to S16), the scaling processing and the shift processing are performed on the second image 25. As shown in FIG. 5, the second image 26 subjected to the scaling processing on the second image 25 is further reduced by one line to the upper side in the vertical direction, and the total reduction width and the shift amount from the second image 21 become the reduction width=2 and the shift amount=−1. The second image 27 subjected to the shift processing on the second image 25 is further shifted downward in the vertical direction by one line, and the total reduction width and the total shift amount from the second image 21 become the reduction width=1 and the shift amount=−2.

Thereafter, in step S9, the similarity degree R1 between the first image and the scaled second image 26 is calculated. In step S11, the similarity degree R2 between the first image and the shifted second image 27 is calculated. Among the second image (scaling image) 26 and the second image (shift image) 27, the image having the higher calculated similarity (R1 or R2) is used for the image to be subjected to the next scaling processing and the next shift processing. Thereafter, the image size determination processing is performed by repeating the same operation.

In the present embodiment, when repeating steps S8 to S16 shown in the flowchart of FIG. 3, that is, when repeating the similarity degree calculation processing and the size adjustment amount determination processing, the image size of the second image is adjusted so that the calculated similarity degree becomes high. When the maximum value Rmax of the similarity degree becomes the maximum value (step S13: No or step S14: No), the arithmetic processing unit 14 ends the processes of steps S8 to S16. Then, the scaling amount and the shift amount when the maximum value Rmax of the similarity degree becomes the maximum value are determined as the image size adjustment amount of the second image.

The second video adjustment unit 13_2 adjusts the size of the second video using the determined image size adjustment amount of the second image, and outputs the adjusted second image to the end processing unit 17. The end processing unit 17 performs the end processing of the adjusted second video based on the determined image size adjustment amount (scaling amount, shift amount) of the second image (step S17). As in the example shown in FIG. 5, when the processing of reducing the second image in the vertical direction is performed, the margin region is generated above and below the second image. In such a case, the edge processing unit 17 performs the processing of interpolating the margin region. For example, the edge processing unit 17 can perform the processing of interpolating the margin region by embedding an interpolation image stored in advance in the margin region. The second video signal after the end processing by the end processing unit 17 is supplied to the video switching unit 18.

The video switching unit 18 receives the first video signal output from the first video adjusting unit 13_1 and the second video signal output from the end processing unit 17, and outputs one of the first video signal and the second video signal to the output control unit 19. The output control unit 19 performs control for displaying the video signal (first video signal or second video signal) supplied from the video switching unit 18 on a display (not shown).

By the above-described processing, the reception processing of the video signal is performed.

Although FIG. 5 shows a case where the second image is reduced in the vertical direction as an example of the scaling processing, the scaling processing may be processing of enlarging in the vertical direction, processing of reducing in the horizontal direction, processing of enlarging in the horizontal direction, or processing of combining these. Further, in FIG. 5, as an example of the shift processing, the case where the second image is shifted downward in the vertical direction is shown, but the shift processing may be a processing of shifting upward in the vertical direction, a processing of shifting rightward in the horizontal direction, a processing of shifting leftward in the horizontal direction, or a processing of combining these.

For example, all the scaling processing and the shift processing described above may be performed in combination. Specifically, a combination of vertically reduction processing and vertically downward shift processing, a combination of the vertically reduction processing and vertically upward shift processing, a combination of the vertically reduction processing and horizontally rightward shift processing, a combination of the vertically reduction processing and horizontally leftward shift processing, a combination of vertically enlargement processing and the vertically downward shift processing, a combination of the vertically enlargement processing and the vertically upward shift processing, a combination of the vertically enlargement processing and the horizontally rightward shift processing, a combination of the vertically enlargement processing and the horizontally leftward shift processing, a combination of horizontally reduction processing and the vertically downward shift processing, a combination of the horizontally reduction processing and the vertically upward shift processing, a combination of the horizontally reduction processing and the horizontally rightward shift processing, a combination of the horizontally reduction processing and the horizontally leftward shift processing, a combination of horizontally enlargement processing and the vertically downward shift processing, a combination of the horizontally enlargement processing and the vertically upward shift processing, a combination of the horizontally enlargement processing and the horizontally rightward shift processing, a combination of the horizontally enlargement processing and the horizontally leftward shift processing, may be performed.

When the scaling processing and the shift processing are performed in combination, the similarity degree is calculated in each combination. In the present embodiment, the scaling amount and the shift amount when the highest similarity degree is obtained among the similarity degrees calculated by each combination are determined as the image size adjustment amount of the second image. In this manner, the image size determination processing can be performed with high accuracy by performing the combination of the scaling processing and the shift processing.

At this time, if the similarity degree does not improve even if the combination of the specific scaling processing and the shift processing is performed, the specific scaling processing and the shift processing may be aborted and the next combination of the scaling processing and the shift processing may be performed.

More specifically, for example, when a combination of a processing of reducing the second image in the vertical direction and a processing of shifting the second image to the lower side in the vertical direction is performed, if the similarity degree does not increase even if the processing of reducing the second image in the vertical direction is repeated several times, or if the similarity degree does not increase even if the processing of shifting the second image to the lower side in the vertical direction is repeated several times, these processing may be aborted to perform the next combination of the scaling processing and the shift processing. In this way, by aborting the processing that does not increase the similarity degree in the middle, it is possible to shorten the entire processing time.

In the above description, the scaling processing and the shift processing are performed in units of one line, but the scaling processing and the shift processing may be performed in units of a plurality of lines, for example, in units of two lines. In this manner, by performing the scaling processing and the shift processing in units of a plurality of lines, it is possible to shorten the processing time required for the image size determination processing. On the other hand, if the number of unit lines to be subjected to the scaling processing and the shift processing is excessively increased, the accuracy of the image size determination processing is deteriorated. Therefore, it is preferable to determine the number of unit lines to be subjected to the scaling processing and the shift processing in consideration of the processing time and the accuracy required for the image size determination processing.

FIG. 6 is a diagram for explaining a specific example of the image size determination processing. In a first example shown in FIG. 6, the second image 32a decoded by the second video decoding unit 12_2 is an image enlarged in the vertical direction as compared with the first image 31a decoded by the first video decoding unit 12_1. When performing the scaling processing and the shift processing on the second image 32a, the processing of reducing the second image 32a in the vertical direction in the scaling processing in step S8 of FIG. 3 and the processing of shifting the second image 32a in the vertical direction in the shift processing in step S10 are repeated. By repeating such processing, as shown in the second video output example 33a, the aspect ratio of the second image 32a can be adjusted to the aspect ratio of the first image 31a. In addition, the position of the second image 32a in the vertical direction can be adjusted to the position of the first image 31a in the vertical direction. In the first example, since the processing of reducing the second image 32a in the vertical direction is performed, a margin region is generated above and below the second image as shown in the second image output example 33a. In such a case, the edge processing unit 17 performs the processing of interpolating the margin region.

In a second example of FIG. 6, the second image 32b decoded by the second video decoding unit 12_2 is an image that is reduced in the vertical direction as compared with the first image 31b decoded by the first video decoding unit 12_1. When performing the scaling processing and the shift processing on the second image 32b, the processing of enlarging the second image 32b in the vertical direction in the scaling processing in step S8 of FIG. 3 and the processing of shifting the second image 32b in the vertical direction in the shift processing in step S10 are repeated. By repeating such processing, as shown in the second video output example 33b, the aspect ratio of the second image 32b can be adjusted to the aspect ratio of the first image 31b. In addition, the position of the second image 32b in the vertical direction can be adjusted to the position of the first image 31b in the vertical direction. In the second example, since the processing of enlarging the second image 32b in the vertical direction is performed, a region outside the display region of the display is generated above and below the second image, as shown in the second image output example 33b. In such a case, the edge processing unit 17 performs the processing of removing the region outside the display region.

In a third example of FIG. 6, the second image 32c decoded by the second video decoding unit 12_2 is an image enlarged in the horizontal direction as compared with the first image 31c decoded by the first video decoding unit 12_1. When performing the scaling processing and the shift processing on the second image 32c, the processing of reducing the second image 32c in the horizontal direction in the scaling processing in step S8 of FIG. 3 and the processing of shifting the second image 32c in the horizontal direction in the shift processing in step S10 are repeated. By repeating such processing, as shown in the second video output example 33c, the aspect ratio of the second image 32c can be adjusted to the aspect ratio of the first image 31c. In addition, the position of the second image 32c in the horizontal direction can be adjusted to the position of the first image 31c in the horizontal direction. In the third example, since the processing of reducing the second image 32c in the horizontal direction is performed, as shown in the second video output example 33c, a margin region is generated on the left and right sides of the second image. In such a case, the edge processing unit 17 performs the processing of interpolating the margin region.

In a fourth example of FIG. 6, the second image 32d decoded by the second video decoding unit 12_2 is an image that is reduced in the horizontal direction as compared with the first image 31d decoded by the first video decoding unit 12_1. When performing the scaling processing and the shift processing on the second image 32d, the processing of enlarging the second image 32d in the horizontal direction in the scaling processing in step S8 of FIG. 3 and the processing of shifting the second image 32d in the horizontal direction in the shift processing in step S10 are repeated. By repeating such processing, as shown in the second video output example 33d, the aspect ratio of the second image 32d can be adjusted to the aspect ratio of the first image 31d. In addition, the position of the second image 32d in the horizontal direction can be adjusted to the position of the first image 31d in the horizontal direction. In the fourth example, since the processing of enlarging the second image 32d in the horizontal direction is performed, a region outside the display region of the display is generated on the left and right of the second image as shown in the second image output example 33d. In such a case, the edge processing unit 17 performs the processing of removing the region outside the display region.

Figure 7:
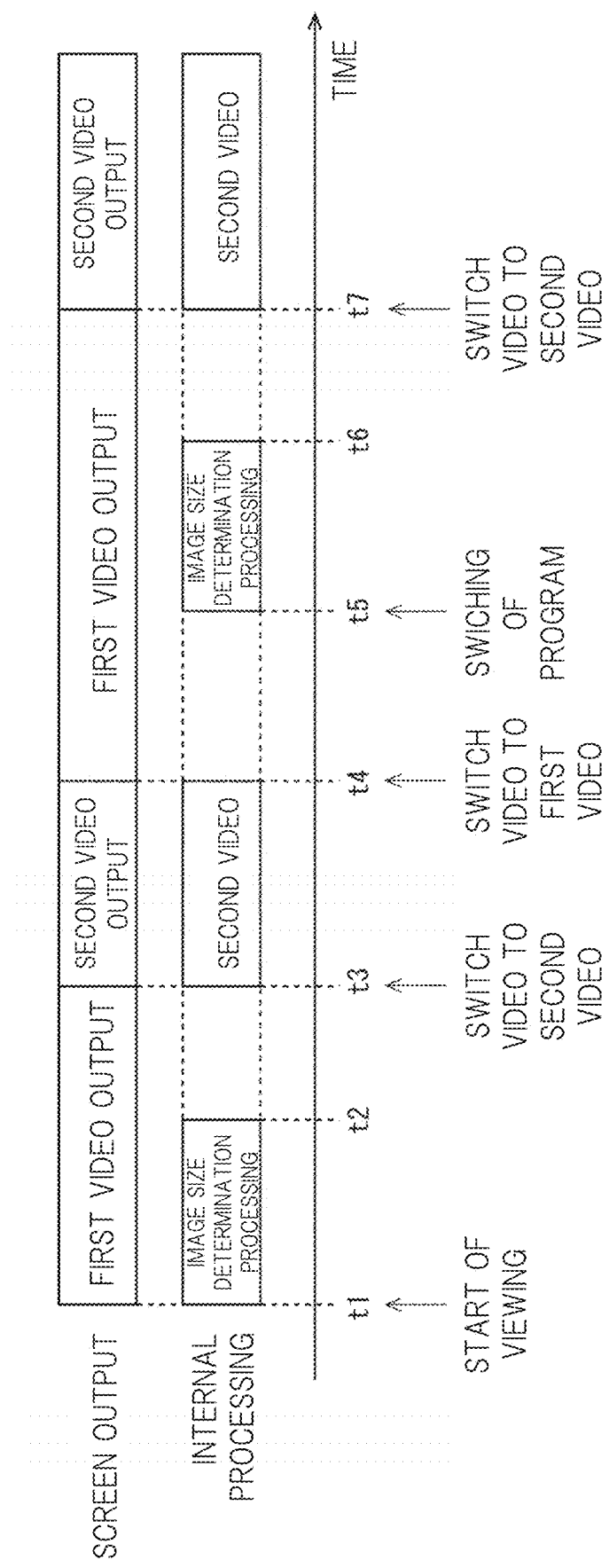
FIG. 7 is a timing chart for explaining the operation of the image signal receiving device according to the first embodiment.

FIG. 7 is a timing chart for explaining the operation of the video signal receiving apparatus according to the present embodiment, and shows an output timing of the first and second videos and a timing of the image size determination processing. As shown in FIG. 7, the output control unit 19 outputs the first video at a timing t1 at which the viewing is started. In addition, the arithmetic processing unit 14 performs the image size determination processing on the second image, as shown in FIGS. 2 and 3. The image size determination processing ends at a timing t2. The image size adjustment amount (scaling amount, shift amount) of the second image obtained at this time is stored in a storage unit such as a memory refer to the memory 104 in FIG. 8).

The first video decoding unit 12_1 and the second video decoding unit 12_2 always perform decoding processing while the first video signal and the second video signal are supplied from the separation unit 11. For example, even when the output control unit 19 outputs the first video, the second video decoding unit 12_2 decodes the second video signal. Conversely, even when the output control unit 19 outputs the second video, the first video decoding unit 12_1 decodes the first video signal.

Thereafter, when the video is switched from the first video to the second video at a timing t3, the second video adjustment unit 13_2 adjusts the size of the second video using the stored image size adjustment amount (scaling amount, shift amount) of the second image. The second video after the size adjustment is output from the output control unit 19 to the display. At this time, the second video adjustment unit 13_2 may adjust the size of the second image in advance by using the image size adjustment amount (scaling amount, shift amount) of the second image, before the timing t3.

Thereafter, when the video is switched from the second video to the first video at a timing t4, the first video is output from the output control unit 19 to the display. Then, when the program is switched at a timing t5, the arithmetic processing unit 14 performs the image size determination processing on the second image of the program after the switching, as shown in FIGS. 2 and 3. The image size determination processing ends at a timing t6. The image size adjustment amount (scaling amount, shift amount) of the second image obtained at this time is stored in a storage unit such as a memory.

For example, program switching can be detected using a remote control operation by a user. The program switching can also be detected by using an electronic program guide (EPG). For example, in the case of the digital terrestrial television broadcasting, since the multi-channel function is provided, in this case, the program is automatically switched to multi-channel broadcasting after the program currently being viewed (main channel) is finished, and the switching of the program at this time can be detected using the electronic program guide. When the program is switched, a signal indicating that the video signal after the switching is received is supplied from the reception processing unit 10 to the arithmetic processing unit 14, as shown in FIG. 1.

Thereafter, when the video is switched from the first video to the second video at a timing t7, the second video adjustment unit 13_2 adjusts the size of the second video using the stored image size adjustment amount (scaling amount, shift amount) of the second image. The second video after the size adjustment is output from the output control unit 19 to the display.

As described above, in the video signal receiving apparatus according to the present embodiment, the image size determination processing is performed at the timing t1 at which viewing is started and at the timing t5 at which the program is switched. Once the image size adjustment amount is determined, the image size determination processing becomes unnecessary while the same program is being viewed.

In the present embodiment, the image size determination processing is performed on one image of each of the first video and the second video, but the image size determination processing may be continuously performed on a plurality of images (frames) in order to improve the accuracy of the image adjustment.

Figure 8:
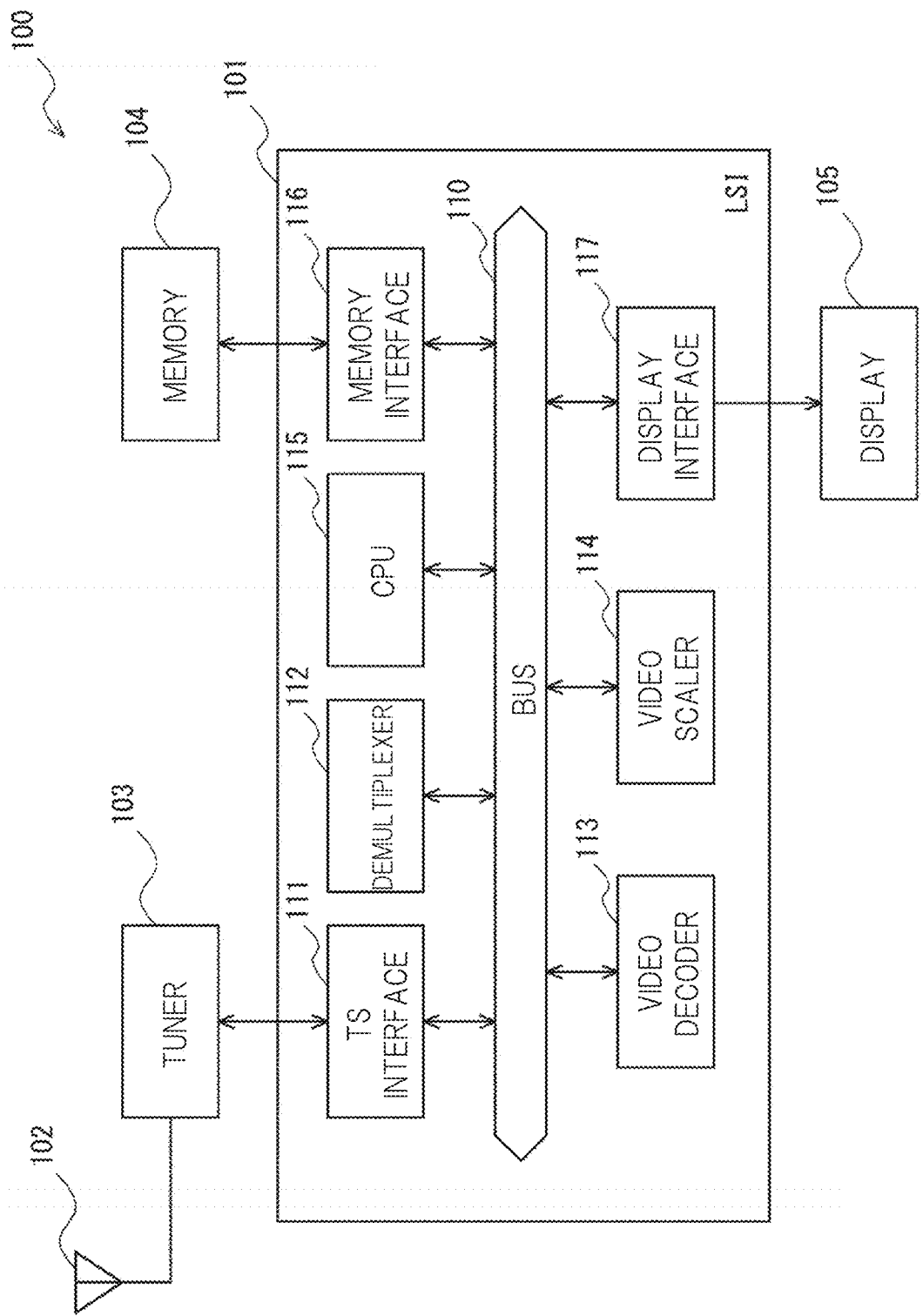
FIG. 8 is a block diagram showing an example of a video receiving system including the video signal receiving apparatus according to the first embodiment.

Next, a hardware configuration of the video signal receiving apparatus according to the present embodiment will be described. FIG. 8 is a block diagram showing an example of a video receiving system including the video signal receiving apparatus according to the present embodiment, and shows an example of a hardware configuration of the video signal receiving apparatus according to the present embodiment.

The video receiving system 100 shown in FIG. 8 includes a data processing device 101, an antenna 102, a tuner 103, a memory 104, and a display 105. The antenna 102 and the tuner 103 receive video signals of digital broadcasting. The data processing apparatus 101 performs various types of processing on the video signal received by the antenna 103 and the tuner 103. The memory 104 is configured by a Synchronous Dynamic Random Access Memory (SDRAM) and the like, and stores data and programs to be executed by the data processing device 101. The display 105 displays an image generated by the data processing device 101.

The data processing device 101 is configured by a semiconductor chip such as a Large Scale Integrated circuit (LSI). The data processing device 101 includes a bus 110, a TS interface 111, a demultiplexer 112, a video decoder 113, a video scaler 114, a Central Processing Unit (CPU) 115, a memory interface 116, and a display interface 117. The components of the data processing device 101 are connected to each other via the bus 110.

The TS interface 111 corresponds to the reception processing unit 10 shown in FIG. 1. The TS interface 111 communicates with the tuner 103 and receives the video signal from the tuner 103. The video signal includes the first video signal (full-segment signal) and the second video signal (one-segment signal).

The demultiplexer 112 corresponds to the separation unit 11 shown in FIG. 1, and separates the first video signal and the second video signal included in the video signal (TS data) received by the TS interface 111.

The video decoder 113 corresponds to the first video decoder 12_1 and the second video decoder 12_2 shown in FIG. 1, and decodes the first video signal and the second video signal separated by the demultiplexer 112.

The video scaler 114 corresponds to the first video adjustment unit 13_1 and the second video adjustment unit 13_2 shown in FIG. 1, and adjusts the sizes of the first video included in the decoded first video signal and the second video included in the decoded second video signal.

The memory interface 116 controls access from the data processing device 101 to the memory 104. The display interface 117 corresponds to the output control unit 19 shown in FIG. 1, and performs control for displaying the video signal (first video signal or second video signal) processed by the data processing device 101 on the display 105.

The CPU 115 corresponds to the arithmetic processing unit 14 shown in FIG. 1, and performs the image size determination processing (that is, the similarity degree calculation processing and the size adjustment amount determination processing) described above. The CPU 115 controls the TS interface 111, the demultiplexer 112, the video decoder 113, the video scaler 114, the memory interface 116 and the display interface 117 of the data processing device 101.

For example, the video decoder 113 decodes the first video signal and the second video signal based on the control of the CPU 115. The video scaler 114 adjusts the sizes of the first video included in the first video signal and the second video included in the second video signal based on the control from the CPU 115.

Each function of the video signal receiving apparatus 1 shown in FIG. 1 is realized by executing the programs stored in the memory 104 shown in FIG. 8 by the CPU 115.

As described in the background art, in the digital terrestrial television broadcasting, two video signals (full-segment broadcasting and one-segment broadcasting) having different image quality and radio wave sensitivity are transmitted. Since the full-segment and the one-segment transmit the same video content (the same program), the mobile terminal such as the car navigation system performs switching between the full-segment and the one-segment in accordance with the radio wave reception sensitivity to display to display the video content with lower noise.

However, since the encoding method is different between the full-segment and the one-segment, a difference in image size (aspect ratio) occurs between the full-segment video and the one-segment video. Therefore, when the full-segment and the one-segment are switched, there is a problem that the video displayed on the display is misaligned, and the user feels uncomfortable. In other words, when the same video content is received by different video signals, switching the video displayed on the display may cause the user to feel uncomfortable.

In addition, the image size (aspect ratio) is also different from broadcasting station to broadcasting station, and the difference in the image size (aspect ratio) between broadcasting stations is caused by a difference in an image processing apparatus (encoding apparatus) used in each broadcasting station, a difference in scaling when a one-segment video is generated from a full-segment video in each broadcasting station, and the like.

In order to solve the above problems, the video signal receiving apparatus according to the present embodiment performs the similarity degree calculation processing for calculating the similarity degree between the first image included in the first video signal and the second image included in the second video signal, and the size adjustment amount determination processing for determining the image size adjustment amount of the second image included in the second video signal based on the similarity degree calculated in the similarity degree calculation processing. When the similarity degree calculation processing and the size adjustment amount determination processing are repeated, the image size of the second image is adjusted so that the similarity degree calculated in the similarity degree calculation processing becomes high. More specifically, the image size adjustment amount of the second image is determined so that the similarity degree calculated in the similarity degree calculation processing increases when the process of determining the image size adjustment amount of the second image based on the similarity degree calculated in the similarity degree calculation processing, calculating the similarity degree between the second image adjusted according to the determined image size adjustment amount and the first image, and determining the image size adjustment amount of the second image based on the calculated similarity degree is repeated.

As described above, in the video signal receiving apparatus according to the present embodiment, since the image size of the second image is adjusted so that the similarity degree between the first image and the second image becomes high, the misalignment of the second image from the first image can be reduced. That is, the aspect ratio of the second image can be adjusted to the aspect ratio of the first image. Therefore, when the same video content is received by different video signals, even if the video displayed on the display is switched, it is possible to suppress the user from feeling uncomfortable.

In the technique disclosed in Japanese unexamined Patent Application publication No. 2010-251897, in order to solve the above problem, a characteristic portion is detected for each of the one-segment video and the full-segment video, a scaling rate is detected based on a comparison result of the detected characteristic portion, and a misalignment of the one-segment video is corrected using the scaling rate.

However, in the technique disclosed in Japanese unexamined Patent Application publication No. 2010-251897, since an intersection of a vertical line and a horizontal line having a length equal to or longer than a certain value is detected as the characteristic portion, it is not possible to extract the characteristic portion to be compared in the case of an image in which a clear line or an intersection such as a rain sky does not exist. In this case, since the scaling rate cannot be detected, there is a problem that the misalignment of the one-segment video cannot be appropriately corrected.

On the other hand, in the video signal receiving apparatus according to the present embodiment, since the image size is adjusted by quantitatively calculating the similarity degree between the first image included in the first video signal and the second image included in the second video signal, rather than detecting the characteristic portion of the video, the optimum image size adjustment amount can be determined independently of the characteristic portion of the video.

Second Embodiment

Figure 9:
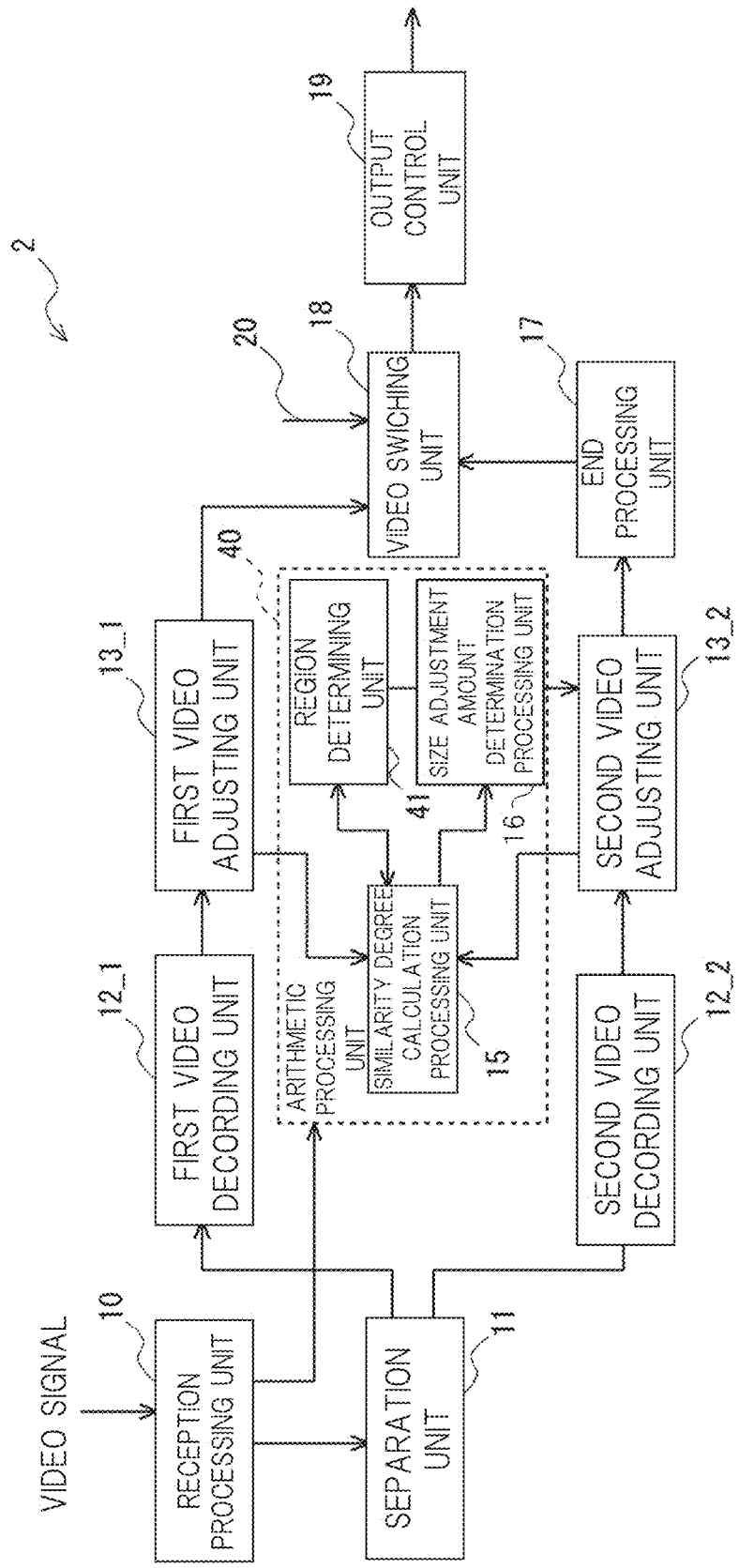
FIG. 9 is a block diagram for explaining an image signal receiving apparatus according to a second embodiment.

Next, a second embodiment will be described. FIG. 9 is a block diagram for explaining a video signal receiving apparatus 2 according to the second embodiment. The video signal receiving apparatus 2 according to the present embodiment is different from the video signal receiving apparatus 1 described in the first embodiment (refer to FIG. 1 and the like) in that an arithmetic processing unit 40 includes a region determining unit 41. Other configurations and operations are the same as those of the video signal receiving apparatus described in the first embodiment, and therefore, the same components are denoted by the same reference numerals, and a repetitive description thereof will be omitted.

As shown in FIG. 9, the arithmetic processing unit 40 includes the region determination unit 41 in addition to the similarity degree calculation processing unit 15 and the size adjustment amount determination processing unit 16. The region determination unit 41 determines a target image region in which the similarity degree calculation processing and the size adjustment amount determination processing are performed.

Figure 10:
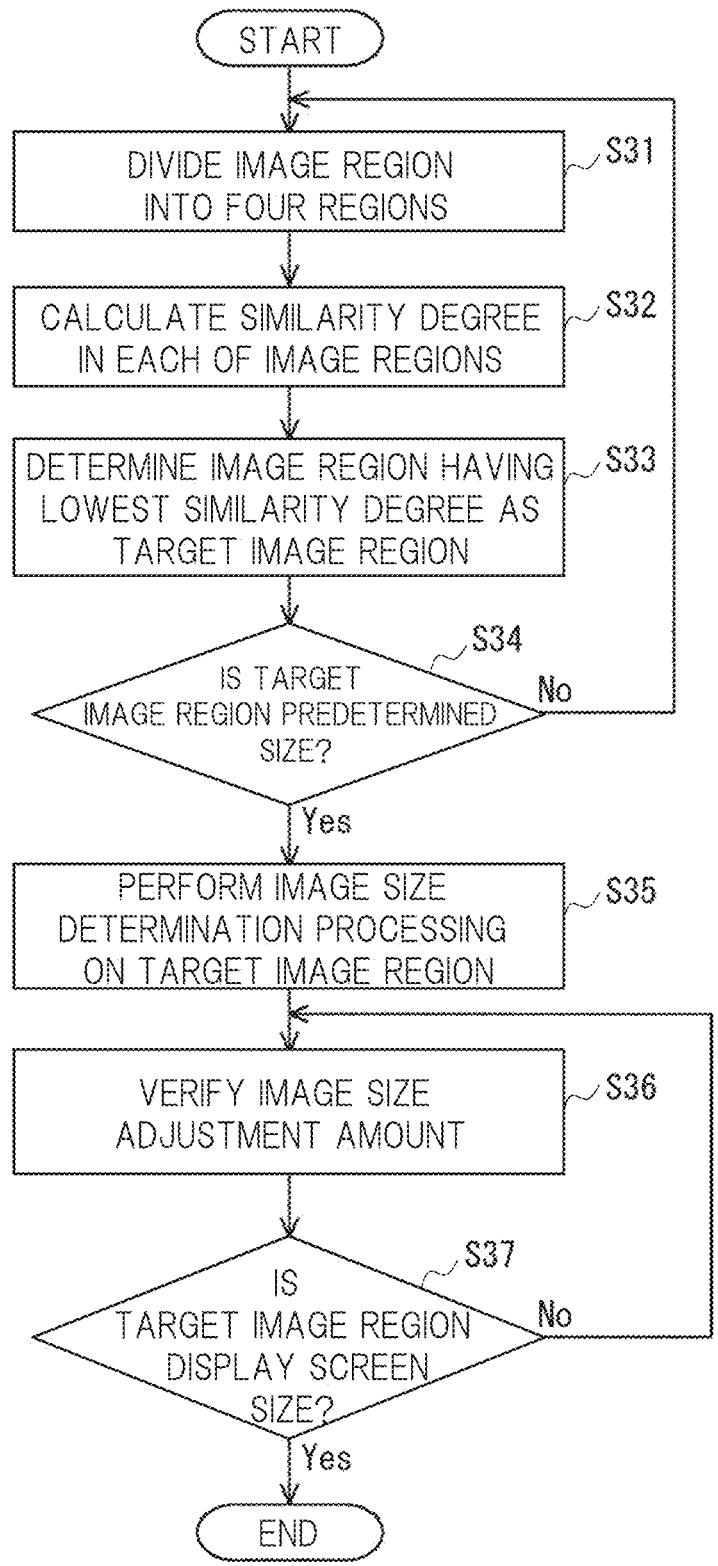
FIG. 10 is a flow chart for explaining an operation of the image signal receiving device according to the second embodiment.

Hereinafter, the operation of the video signal receiving apparatus 2 according to the present embodiment will be described with reference to a flowchart shown in FIG. 10. In FIG. 10, the image size determination processing is described, but the other operations are the same as those described in the first embodiment (refer to FIGS. 2 and 3).

Figure 11:
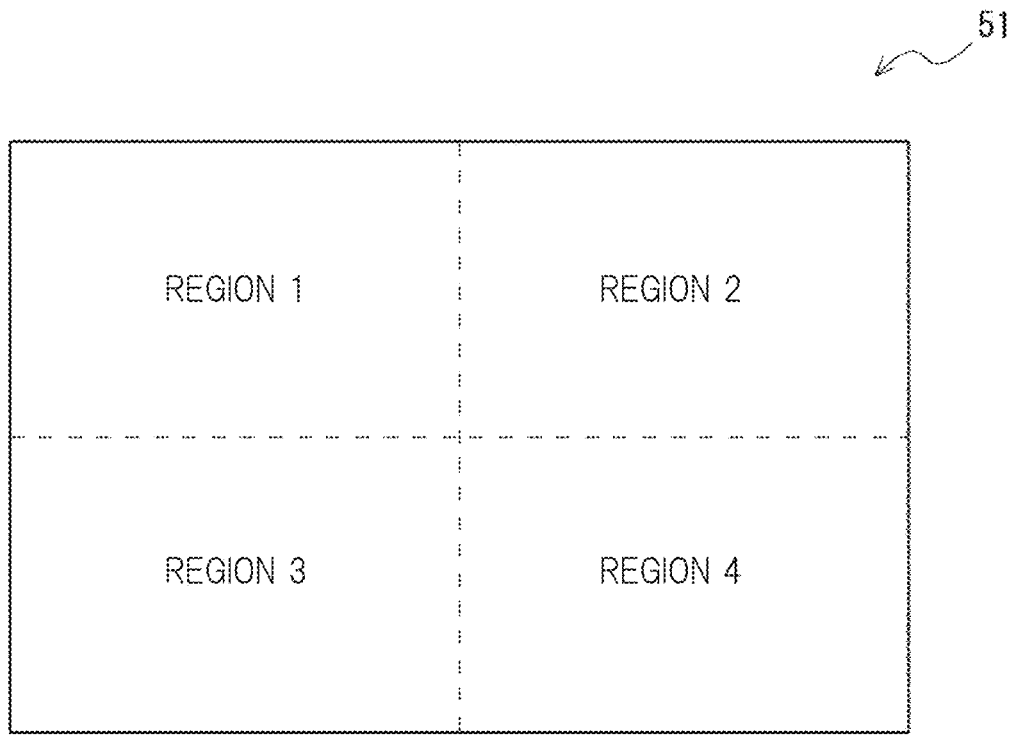
FIG. 11 is a diagram illustrating the operation of the image signal receiving apparatus according to the second embodiment.

First, the region determining unit 41 divides an image region of the first image and an image region of the second image into four regions, respectively (step S31). Specifically, as shown in FIG. 11, the image region 51 of the first image and the second image is divided into regions 1 to 4.

Thereafter, the similarity degree calculation processing unit 15 calculates the similarity degree in each of the image regions (regions 1 to 4) (step S32). The processing of calculating the similarity degree is the same as that described in the first embodiment (refer to FIG. 4). For example, in the present embodiment, when the similarity degree calculation processing in FIG. 4 is performed, the coordinates (x, y) of the first and second images are set in the respective regions 1 to 4, and the similarity degrees in the respective regions 1 to 4 are calculated. Then, among the respective image regions (regions 1 to 4), the image region having the lowest calculated similarity degree is determined as the target image region (step S33). In the present embodiment, as an example, the region 1 in FIG. 11 is defined as the determined target image region x.

It is determined whether or not the determined target image region has a predetermined size (step S34). Since the size of the current target image region (refer to FIG. 11) is ¼, for example, when the predetermined size is set to ¹⁄₁₆ (step S34: No), the operations of steps S31 to S34 are repeated again.

That is, the region determining unit 41 divides the target image region of the first image and the target image region of the second image into four regions, respectively (step S31). Specifically, as shown in FIG. 11, the target image region x of the image region 52 of the first image and the second image is divided into regions x-1 to x-4. Thereafter, the similarity degree calculation processing unit 15 calculates the similarity degree in each of the image regions (regions x-1 to x-4) (step S32). Then, among the respective image regions (regions x-1 to x-4), the image region having the lowest calculated similarity degree is determined as the target image region (step S33). In the present embodiment, as an example, the region x-4 in FIG. 11 is set as the determined target image region.

It is determined whether or not the determined target image region x-4 has a predetermined size (step S34). Since the size of the current target image region x-4 is ¹⁄₁₆, it coincides with the predetermined size (¹⁄₁₆) (step S34: Yes).

Next, the image size determination processing is performed on the target image region x-4 of the predetermined size (¹⁄₁₆) determined in step S33 (step S35). The image size determination processing is performed by the similarity degree calculation processing unit 15 and the size adjustment amount determination processing unit 16 of the arithmetic processing unit 40. The image size adjustment amount (scaling amount, shift amount) is determined by performing the image size determination processing. The image size determination processing is the same as that described in the first embodiment, and a duplicated description thereof will be omitted.

Thereafter, the image size adjustment amount is verified in the region 1 having an area four times as large as the target image region x-4 (step S36). More specifically, as shown in FIG. 11, the similarity degree calculation processing is performed on the region 1 having the area four times as large as the target image region x-4. At this time, the second image of the region 1 is adjusted using the image size adjustment amount (scaling amount, shift amount) obtained in step S35, and the similarity degree calculation processing is performed. When the similarity degree obtained at this time is approximately the same as the similarity degree obtained when the image size adjustment amount (scaling amount, shift amount) is obtained in step S35 (that is, corresponds to "Rmax" in FIG. 3), it can be determined that the image size adjustment amount is appropriate.

On the other hand, when the similarity degree of the region 1 having the area four times as large as the target image region x-4 is lower than the similarity degree obtained when the image size adjustment amount (scaling amount, shift amount) is obtained in step S35 (that is, corresponds to "Rmax" in FIG. 3), it is determined that the image size adjustment amount is inappropriate.

An example of a case where it is determined that the image size adjustment amount is inappropriate is a case where a lattice-like pattern is present in the target image region x-4. That is, in the case where the image size determination processing is performed on the lattice-like pattern, even if the shift processing is performed so as to increase the similarity degree to a local (target image region x-4), if the shift direction is incorrect, the similarity degree may be low in the region 1 having the area four times as large as the target image region x-4. In such a case, the image size determination processing is performed again on the region 1 having the area four times as large as the target image region x-4 (refer to step S35).

Next, it is determined whether or not the target image region is the display screen size (step S37). At the present time, since the size of the target image region (region 1) is ¼ (step S37: NO), the process of step S36 is repeated again. That is, as shown in FIG. 11, the similarity degree calculation processing is performed on the region 51 (display screen size) having the area four times as large as the target image region (region 1). At this time, the second image of the region 51 (display screen size) is adjusted using the image size adjustment amount (scaling amount, shift amount) obtained in step S35, and similarity degree calculation processing is performed. When the similarity degree obtained at this time is approximately the same as the similarity degree obtained when the image size adjustment amount (scaling amount, shift amount) is obtained in step S35 (that is, corresponds to "Rmax" in FIG. 3), it can be determined that the image size adjustment amount is appropriate.

Thereafter, it is determined whether or not the target image region is the display screen size (step S37). Since the region 51 is the display screen size this time (step S37: Yes), the process of the flowchart shown in FIG. 10 is terminated.

By performing the above-described processes, the image size adjustment amount corresponding to the second image (scaling amount, shift amount) can be determined.

In the present embodiment, the image size determination processing is performed on the divided image regions. That is, since the image size determination processing is performed locally, the time of the image size determination processing can be shortened as compared with the case of the first embodiment.

As an example, a result of comparing the processing amounts of the first embodiment and the second Embodiment with the screen size (display pixel) as an index of the processing amount in the case where the second image is vertically reduced by N lines is shown below.

[the processing amount according to the first embodiment]
(1) Similarity degree calculation processing $$= \text{display\_pixel} \times 1 + \text{display\_pixel} \times (2 \times (N+1))$$

$$= \text{display\_pixel} \times (2N+3)$$

"display_pixel×1" indicates the similarity degree calculation processing at an initial position (Step S6 in FIG. 3). "display_pixel×(2×(N+1))" indicates the similarity degree calculation processing in N+1 scaling processing (steps S8 to S16 in FIG. 3).

(2) Size adjustment amount determination processing=display_pixel×(N+1)

"display_pixel×(N+1)" indicates N+1 times of the scaling processing.

[The processing amount according to the second embodiment (When division processing is performed on the image region twice (divide into ¹⁄₁₆))]
(1) Similarity degree calculation processing $$= \text{display\_pixel} \times 1 + (\text{display\_pixel}/16) \times 2N +$$
$$(\text{display\_pixel}/4) \times 2 + \text{display\_pixel} \times 2$$

$$= \text{display\_pixel} \times 3 + ((8+2N) \times \text{display\_pixel}/16)$$

"display_pixel×1" indicates the similarity degree calculation processing at the initial position. "(display_pixel/16)×2N" indicates the similarity degree calculation processing after region division (step S35 in FIG. 10). "(display_pixel/4)×2" indicates the similarity degree calculation processing for verification at the ¼ screen size (step S36 in FIG. 10). "display_pixel×2" indicates the similarity degree calculation processing for verification at the screen size (step S36 in FIG. 10).

(2) Size adjusting amount determination processing $$= (\text{display\_pixel}/16) \times (N+1) + (\text{display\_pixel}/4) \times 1 + \text{display\_pixel} \times 1$$

$$= \text{display\_pixel} + ((5+N) \times \text{display\_pixel}/16)$$

"(display_pixel/16)×(N+1)" indicates the scaling processing after the screen size is divided into ¹⁄₁₆ (step S35 in FIG. 10).

"(display_pixel/4)×1" indicates the scaling processing for verification at the ¼ screen size (step S36 in FIG. 10). "display_pixel×1" indicates the scaling processing for verification at the screen size (step S36 in FIG. 10).

The processing amount according to the first embodiment is a value "display_pixel×(3N+4)" obtained by adding the processing amount "display_pixel×(2N+3)" of the similarity degree calculation processing and the processing amount "display_pixel×(N+1)" of the size adjustment amount determination processing.

The processing amount according to the second embodiment is a value "display_pixel×4+(13+3N)×display_pixel/16" obtained by adding the processing amount "display_pixel×3+((8+2N)×display_pixel/16)" of the similarity degree calculation processing and the processing amount "display_pixel+((5+N)×display_pixel)/16)" of the size adjustment amount determination processing.

Here, since N is an integer of 1 or more, the processing amount "display_pixel×4+(13+3N)×display_pixel/16" according to the second embodiment is smaller than the processing amount "display_pixel×(3N+4)" according to the first embodiment.

In the present embodiment, the image region having the lowest similarity degree among the divided image regions is set as the target image region (refer to step S33 in FIG. 10). The reason for this is as follows. That is, it can be estimated that a region in which the similarity degree between the first image and the second image is low is a region in which an object having a large feature amount exists.

For example, if there is an image of an airplane in the region 1 and an image of a cloud in the region 2, the image of the airplane in the region 1 will have a clear boundary, but the image of the cloud in the region 2 will not have a clear boundary. Therefore, when comparing the similarity degrees between the region 1 and the region 2, the similarity degree tends to be higher in the image of the region 2 (an image with an unclear boundary) than in the image of the region 1 (an image with a clear boundary). That is, the mean square error of the pixel values of the first image and the second image tends to be smaller in the image of the region 2 (the image with the unclear boundary) than in the image of the region 1 (the image with the clear boundary), and thus the similarity degree tends to be higher. In the present embodiment, the image size determination processing can be performed on the image region having the large feature amount by using the image region having the low similarity degree as the target image region. Therefore, the accuracy in the image size determination processing can be improved.

In the example described above, the image region having the lowest similarity degree among the divided image regions is set as the target image region. However, in the present embodiment, an image region other than the image region having the lowest similarity degree (e.g., the image region having the second lowest similarity degree among the divided image regions) may be used as the target image region.

In the present embodiment, in the first similarity degree calculation processing (step S32 in FIG. 10), the similarity degree in each divided region may be stored in the smallest screen division unit (1/16 in the above example). By storing the similarity degree in this manner, the subsequent similarity degree calculation processing (step S32 in FIG. 10) can be omitted, and the processing time can be shortened.

Third Embodiment

Figure 12:
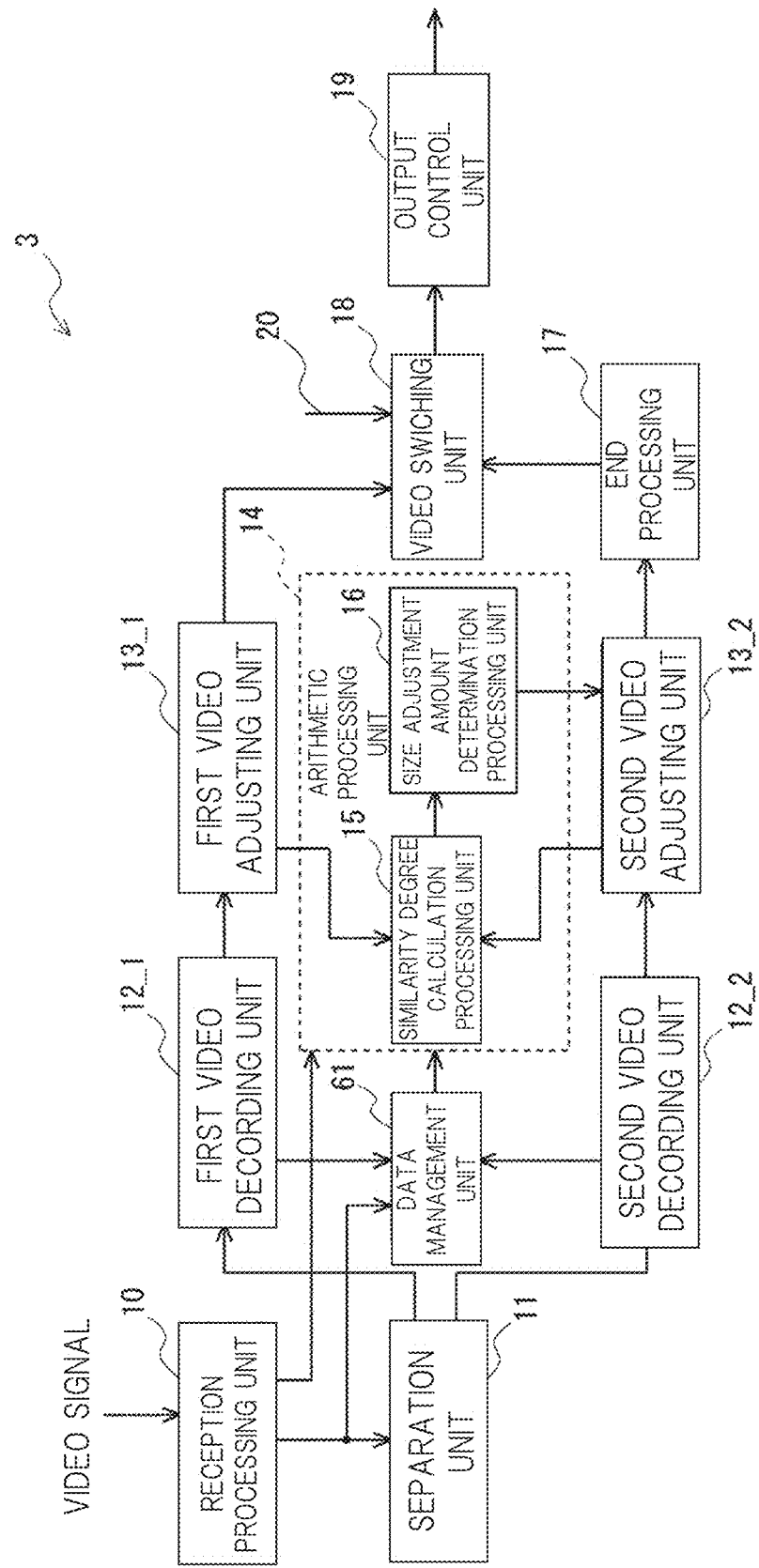
FIG. 12 is a block diagram for explaining an image signal receiving apparatus according to a third embodiment.

Next, a third embodiment will be described. FIG. 12 is a block diagram for explaining a video signal receiving apparatus 3 according to the third embodiment. The video signal receiving apparatus 3 according to the present embodiment is different from the video signal receiving apparatus 1 described in the first embodiment (refer to FIG. 1 and the like) in that it includes a data management unit 61. Other configurations and operations are the same as those of the video signal receiving apparatus described in the first embodiment, and therefore, the same components are denoted by the same reference numerals, and a repetitive description thereof is omitted. Note that the present embodiment may be combined with the second embodiment.

As shown in FIG. 12, the video signal receiving apparatus 3 according to the present embodiment includes the data management unit 61. The data management unit 61 manages data relating to the image size adjustment amount (scaling amount, shift amount) of the second image determined by the image size determination processing executed in the past. The data management unit 61 manages broadcasting station information of a transmission source of the first and second video signals and the image size adjustment amount in association with each other. At this time, the data management unit 61 may manage the broadcasting station information of the transmission source of the first and second video signals, the decoding information of the first and second video signals (resolution information), and the image size adjustment amount in association with one another. For example, as shown in FIG. 8, the respective pieces of information managed by the data management unit 61 (i.e., the broadcasting station information, the decoding information of the first and second video signals, and the image size adjustment amount) may be stored in the memory 104 provided outside.

Figure 13:
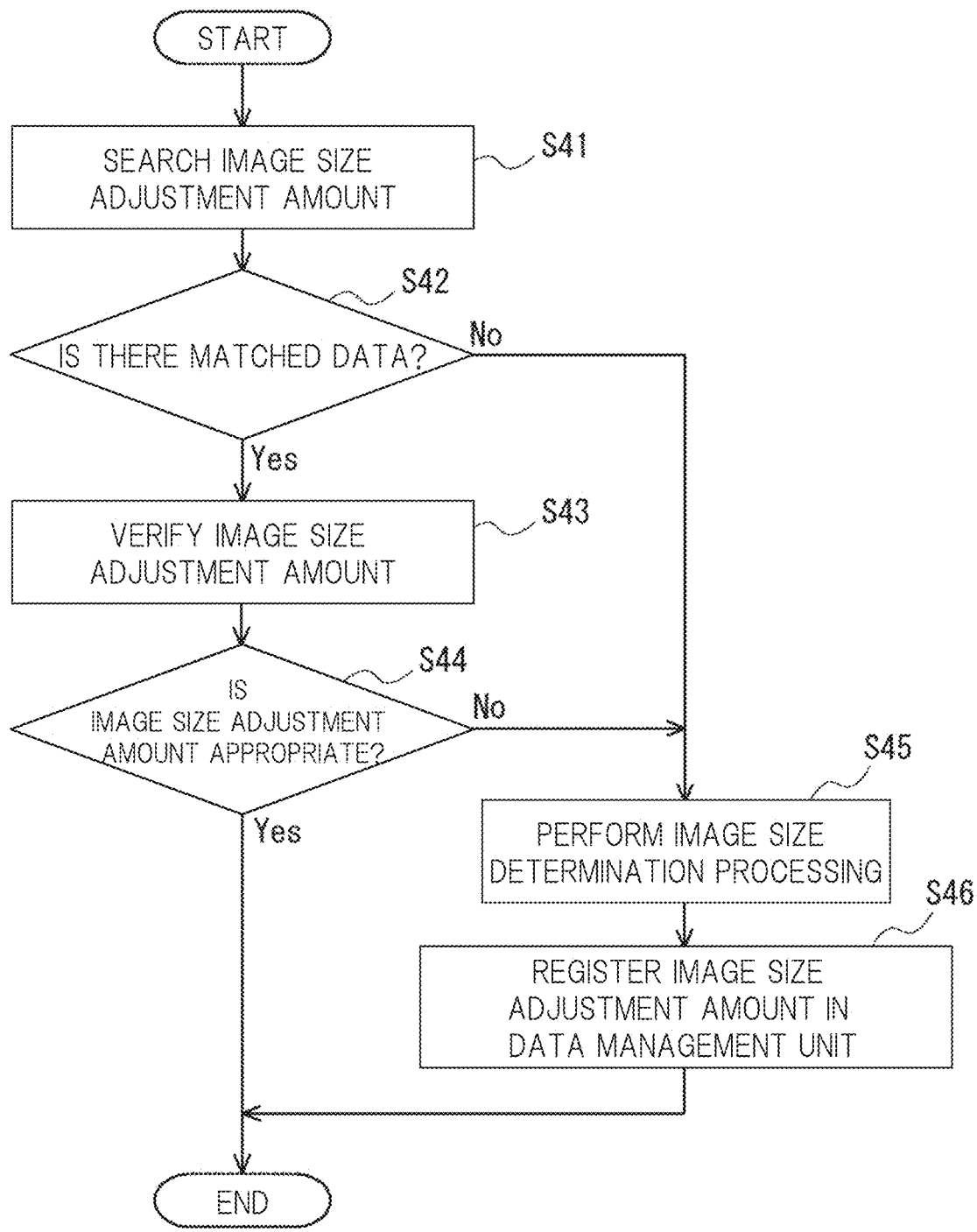
FIG. 13 is a flow chart illustrating an operation of the image signal receiving device according to the third embodiment.

Hereinafter, the operation of the video signal receiving apparatus 3 according to the present embodiment will be described with reference to a flowchart shown in FIG. 13. Although the operation of the data management unit 61 is mainly described in FIG. 13, the other operations are the same as those described in the first embodiment (refer to FIGS. 2 and 3).

First, when receiving the video signal, the reception processing unit 10 shown in FIG. 12 supplies the broadcasting station information of the transmission source of the received video signal to the data management unit 61. The data management unit 61 searches the image size adjustment amount corresponding to the broadcasting station information (metadata) supplied from the reception processing unit 10 (step S41). At this time, the data management unit 61 may further search the image size adjustment amount by using the decoded information (resolution information) of the first and second video signals.

As a result of the search in step S41, if there is data that matches the broadcasting station information, the data management unit 61 supplies the matched image size adjustment amount to the arithmetic processing unit 14 (step S42: Yes). Then, the arithmetic processing unit 14 verifies the image size adjustment amount supplied from the data management unit 61 (step s43). Specifically, the size adjustment amount determination processing unit 16 of the arithmetic processing unit 14 determines the image size adjustment amount supplied from the data management unit 61 as the size adjustment amount of the second image. Thereafter, the similarity degree calculation processing unit 15 calculates the similarity degree between the second image adjusted using the image size adjustment amount and the first image. In addition, the similarity degree calculation processing unit 15 calculates the similarity degree between the second image for which the image size adjustment is not performed and the first image. When the similarity degree between the adjusted second image and the first image is larger than the similarity degree between the second image for which the image size adjustment is not performed and the first image, it is determined that the image size adjustment amount supplied from the data management unit 61 is appropriate. Through such process, it is determined whether or not the image size adjustment amount supplied from the data management unit 61 is appropriate. The operations of the similarity degree calculation processing unit 15 and the size adjustment amount determination processing unit 16 are the same as those described in the first embodiment, and therefore, duplicated descriptions will be omitted.

For example, an encoding parameter on the broadcasting station side may be changed due to a reason such as a facility on the broadcasting station side is updated. In such a case, since it is assumed that the image size adjustment amount supplied from the data management unit 61 is not appropriate, in the present embodiment, it is verified in step S43 whether or not the image size adjustment amount supplied from the data management unit 61 is appropriate.

When it is determined that the image size adjustment amount supplied from the data management unit 61 is appropriate (step S44: Yes), the size of the second image is adjusted using this image size adjustment amount.

On the other hand, when there is no data coinciding with the broadcasting station information in step S42 (step S42: No), or when it is determined in step S44 that the image size adjustment amount is not appropriate (step S44: No), the arithmetic processing unit 14 performs the image size determination processing in order to obtain the optimum image size adjustment amount of the second image again (step S45). The image size determination processing is performed by the similarity degree calculation processing unit 15 and the size adjustment amount determination processing unit 16 of the arithmetic processing unit 40. The image size adjustment amount (scaling amount, shift amount) of the second image is determined by performing the image size determination processing. The image size determination processing is the same as that described in the first embodiment, and therefore, a duplicated description thereof will be omitted.

The image size adjustment amount determined in step S45 is newly registered in the data management unit 61 in association with the broadcasting station information of the transmission source of the video signal (step S46). The size of the second image is adjusted using the image size adjustment amount determined in step S45.

In the video signal receiving apparatus 3 according to the present embodiment, the data management unit 61 manages the broadcasting station information and the image size adjustment amount in association with each other. When there is data (image size adjustment amount) that matches the broadcasting station information of the received video signal, the image size of the second video is adjusted using the matched image size adjustment amount. When there is the image size adjustment amount that matches the broadcasting station information of the received video signal, the image size determination processing can be omitted, so that the time required for processing the received video signal can be shortened.

As an example, the processing amount when the image size of the second video is adjusted using the image size adjustment amount managed by the data management unit 61 is shown. In the following description, the display_pixel is used as an index of the processing amount.

[The processing amount according to the third embodiment]

(1) Similarity degree calculation processing $= \text{display\_pixel} \times 1;$ similarity degree calculation processing at an initial position $+$ $\text{display\_pixel} \times 1;$ similarity degree calculation processing by search data $+$ $\text{display\_pixel} \times 1;$ similarity degree calculation processing for verification $= \text{display\_pixel} \times 3$ (2) size-adjustment amount determination processing $= \text{display\_pixel} \times 1;$ scaling processing by search data $+$ $\text{display\_pixel} \times 1;$ scaling processing for verification $= \text{display\_pixel} \times 2$ The processing amount according to the third embodiment is much smaller than the processing amount according to the first and second embodiments described above. Therefore, by providing the data management unit 61, it is possible to shorten the time required for processing the received video signal.

Fourth Embodiment

Figure 14:
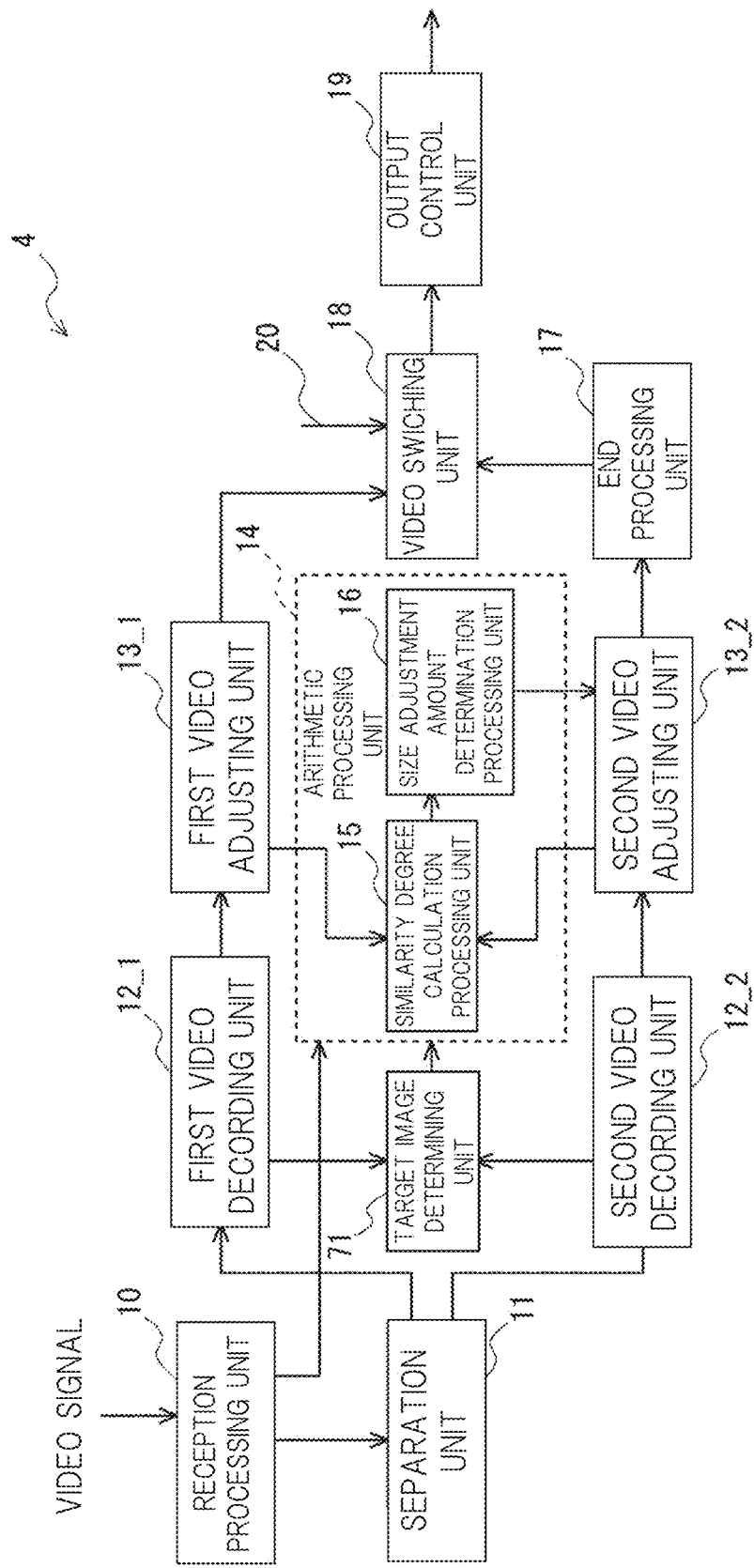
FIG. 14 is a block diagram illustrating an image signal receiving device according to a fourth embodiment.

Next, a fourth embodiment will be described. FIG. 14 is a block diagram for explaining a video signal receiving apparatus 4 according to the fourth embodiment. The video signal receiving apparatus 4 according to the present embodiment is different from the video signal receiving apparatus 1 described in the first embodiment (refer to FIG. 1 and the like) in that it includes a target image determining unit 71. Other configurations and operations are the same as those of the video signal receiving apparatus described in the first embodiment, and therefore, the same components are denoted by the same reference numerals, and a repetitive description thereof will be omitted. Note that the present embodiment may be combined with the second and third embodiments.

For example, when the reception state of radio waves is poor, the decoded video may include noise. When such an image is used in the image size determination processing, there is a problem that the size of the second image cannot be appropriately determined. In the video signal receiving apparatus 4 according to the present embodiment, such a problem is solved by providing the target image determining unit 71 and excluding a noisy image from the target image used in the image size determining processing. Hereinafter, the video signal receiving apparatus 4 according to the present embodiment will be described in detail.

As shown in FIG. 14, the video signal receiving apparatus 4 according to the present embodiment includes the target image determining unit 71. The target image determination unit 71 uses quantization parameters supplied from the first video decoding unit 12_1 and the second video decoding unit 12_2, respectively, to determine the target image to be subjected to the similarity degree calculation processing and the size adjustment amount determination processing. For example, the target image determination unit 71 can determine an image in which the quantization parameter supplied from each of the first video decoding unit 12_1 and the second video decoding unit 12_2 is smaller than a predetermined threshold value as the target image.

For example, when the target image determination unit 71 acquires the quantization parameters from the first video decoding unit 12_1 and the second video decoding unit 12_2, the target image determination unit 71 accumulates the quantization parameters of about 1 Group Of Pictures (GOP) and calculates a mean value of the quantization parameters. The mean value is determined as a threshold value of a quantization parameter of a reproduced video, and when the quantization parameter lower than the threshold value is acquired next, the first image and the second image corresponding to the quantization parameter are determined as the target image. Then, the image size determination processing is performed on the determined target image. Since the image size determination processing is the same as that described in the first embodiment, a duplicated description will be omitted. The threshold value of the quantization parameter may be a predetermined absolute value instead of the mean value as described above.

The quantization parameter is one of encoding parameters of video signals, and a Quantization Parameter (QP) value is used in the H.264 standard and a Quantizer Scale (QS) value is used in the MPEG-2 standard. The quantization parameter is a parameter related to an image quality and a bit rate, and if the quantization parameter is decreased, the image quality deterioration can be suppressed, but the bit rate becomes high. On the other hand, if the quantization parameter is increased, the image quality deteriorates, but the rate can be suppressed. In a digital broadcast transmitting apparatus of the broadcasting station, the quantization parameter is adjusted so as not to exceed a prescribed bit rate. In the present embodiment, attention is paid to the fact that there is a correlation between the quantization parameter and the image quality, and by determining the image in which the quantization parameter is smaller than the predetermined threshold value as the target image, the accuracy of the image size determination processing is improved.

In the present embodiment, the target image determination unit 71 may determine the target image to be subjected to the similarity degree calculation processing and the size adjustment amount determination processing using decoding error information supplied from the first video decoding unit 12_1 and the second video decoding unit 12_2. For example, the target image determination unit 71 may exclude an image in which the decoding error information supplied from the first video decoding unit 12_1 and the second video decoding unit 12_2 indicates an error from the target image. Here, the decoding error means that the first video decoding unit 12_1 and the second video decoding unit 12_2 cannot properly decode the video, for example, when the reception state of the radio wave is poor.

Further, in the present embodiment, the target image determination unit 71 may determine the target image to be subjected to the similarity degree calculation processing and the size adjustment amount determination processing by using both the quantization parameter and the decoding error information supplied from the first video decoding unit 12_1 and the second video decoding unit 12_2. In this case, it is possible to improve the accuracy of the image size determination processing by determining the image in which the quantization parameter is smaller than the predetermined threshold as the target image and excluding the image in which the decoding error information indicates the error from the target image.

In the video signal receiving apparatus according to the present embodiment described above, the target image is determined using the quantization parameter and the decoding error information. Therefore, since an image having a significant deterioration in image quality, i.e., an image having a large amount of noise, can be excluded from the target image, the accuracy of the image size determination processing can be improved.

The technical content according to the present embodiment can also be applied to the video signal receiving apparatus according to the second embodiment. That is, in the video signal receiving apparatus described in the second embodiment, the image region is divided, and the image size determination processing is locally performed on the divided image region. Therefore, when noise exists in the divided image region, erroneous detection (error) may occur in the image size determination processing. Such a problem can be solved by using the quantization parameter as in the video signal receiving apparatus according to the present embodiment. That is, by setting the condition that the quantization parameter of the divided region is smaller than the predetermined threshold, it is possible to suppress the erroneous detection (error) in the image size determination processing.

At this time, in the video signal receiving apparatus described in the second embodiment, it is preferable that the minimum size of the divided region (in the example shown in FIG. 11, the region x-1 or the like, ¹⁄₁₆ of the image region 52) is equal to or larger than "a multiplied value of a coded macroblock of the second video and an enlargement ratio to the display screen".

That is, the "encoded macro block" is a block unit at the time of encoding, and the quantization parameter is determined in the block unit. The "enlargement ratio to the display screen" is an enlargement ratio when the second video is displayed on the display screen. For example, when a screen resolution of the second video is QVGA (320×240) and a screen resolution of the display screen is full HD (1920×1080), the "enlargement ratio to the display screen" is the enlargement ratio when the QVGA is displayed on the display screen of full HD (1920×1080), which is approximately 5 to 6 times.

Therefore, by setting the minimum size of the divided region (in the example shown in FIG. 11, the region x-1 or the like) to be equal to or larger than "the multiplied value of the coded macroblock of the second video and the enlargement ratio to the display screen", at least one coded macroblock can be included in the divided region of the minimum size (in the example shown in FIG. 11, the region x-1 or the like). Therefore, the target image can be determined by using the quantization parameter of the coded macroblock included in the divided region of the minimum size. That is, by determining the image in which the quantization parameter of the macro block included in the divided region (e.g., the region x-1 in FIG. 11) is smaller than the predetermined threshold value as the target image, the erroneous detection (error) can be suppressed in the image size determination processing.

The video signal receiving apparatus according to the first to fourth embodiments described above can also be applied to seamless switching in an overseas digital broadcasting standard, an Internet streaming service, or simultaneous television and Internet broadcasting.

For example, when switching between simultaneous broadcasting in the U.S. digital broadcasting standard ATSC M/H, the Chinese digital broadcasting standard DTMB, or the European digital broadcasting standard DVB T, the image sizes may be adjusted by comparing the respective images corresponding to the first image and the second image described above). By such process, it is possible to reduce a sense of discomfort at the time of video switching in the digital broadcasting of each country overseas.

In case that an input source (television or Internet) is switched in accordance with a state of the radio wave, the image size may be adjusted by comparing the respective images (corresponding to the first image and the second image) when the television and the Internet are switched to each other. By such process, it is possible to reduce a sense of discomfort at the time of switching between simultaneous broadcasting videos using the television and the Internet.

When the input source (full HD, SD, and like) is switched in accordance with a state of a speed of an Internet line, the image size may be adjusted by comparing the respective images (corresponding to the first image and the second image described above). By such process, it is possible to reduce a sense of discomfort at the time of video switching in the streaming service of the Internet.

The inventions by the present inventors have specifically been described based on the preferred embodiments. The present invention is not limited to the preferred embodiments. Needless to say, various changes may be made without departing from the scope thereof.

What is claimed is:

1. A video signal receiving apparatus comprising:
    a reception processing unit which receives a first video signal for transmitting a same video content with a first aspect ratio and a second video signal for transmitting the same video content with a second aspect ratio different from the first aspect ratio respectively;
    a first video adjustment unit which adjusts a size of a first video included in the first video signal;
    a second video adjustment unit which adjusts a size of a second video included in the second video signal; and
    an arithmetic processing unit which performs image size determination processing for determining a size adjustment amount of the second video adjusted by the second video adjustment unit,
    wherein the second video adjustment unit performs scaling processing for reducing or enlarging a second image included in the second video signal to generate a scaling image, and performs shift processing for shifting the second image in a horizontal or vertical direction to generate a shift image,
    wherein the arithmetic processing unit:
        calculates a similarity degree between a first image included in the first video signal and the scaling image, and calculates a similarity degree between the first image and the shift image; and
        uses the scaling image or the shift image having the higher calculated similarity degree as an image to be subjected to a next scaling processing and a next shift processing in the second video adjusting unit,
    wherein the arithmetic processing unit:
        sets the higher of the similarity degree between the first image and the scaling image and the similarity degree between the first image and the shift image to a maximum value of the similarity degree; and
        if the higher of a similarity degree between a scaling image obtained by performing the next scaling processing and the first image and a similarity degree between a shift image obtained by performing the next shift processing and the first image is lower than the set maximum value of the similarity degree, determines a scaling amount and a shift amount of the scaling image or the shift image having the higher similarity degree as the size adjustment amount of the second video, and
    wherein the second video adjustment unit adjusts the size of the second video using the determined size adjustment amount of the second video.

2. The video signal receiving apparatus according to claim 1, wherein the arithmetic processing unit:
    sets the higher of the similarity degree between the first image and the scaling image and the similarity degree between the first image and the shift image to the maximum value of the similarity degree,
    if the higher of a similarity degree between a scaling image obtained by performing the next scaling processing and the first image and a similarity degree between a shift image obtained by performing the next shift processing and the first image is higher than the set maximum value of the similarity degree, updates the maximum value of the similarity degree using the higher similarity degree.

3. The video signal receiving apparatus according to claim 1, further comprising an end processing unit which performs end processing on the second video whose size is adjusted; and
    wherein the end processing unit performs at least one of processing for interpolating a margin region generated when the second video whose size is adjusted is displayed on a display and processing for removing a region outside a display region generated when the second video whose size is adjusted is displayed on the display.

4. The video signal receiving apparatus according to claim 1, further comprising a video switching unit which inputs the first video adjusted by the first video adjusting unit and the second video adjusted by the second video adjusting unit, and outputs one of the first video and the second video.

5. The video signal receiving apparatus according to claim 4,
    wherein an image quality of the second video signal is lower than that of the first video signal, and
    wherein the video switching unit switches an output video from the first video to the second video when a reception state of the first video signal is worsened from a predetermined reference.

6. The video signal receiving apparatus according to claim 1, wherein the first image and the second image are time-synchronized images.

7. The video signal receiving apparatus according to claim 1, wherein the similarity degree is calculated using a pixel value at each coordinate of the first image and a pixel value of the second image at a coordinate associated with each coordinate of the first image.

8. The video signal receiving apparatus according to claim 7,
wherein the pixel value of the first image comprises a luminance value of the first image, and
wherein the pixel value of the second image comprises a luminance value of the second image.

9. The video signal receiving apparatus according to claim 7,
wherein the similarity degree is calculated using a reciprocal of a sum of $\{P1(x, y)-P2(x, y)\}^2$,
wherein $\{P1(x, y)-P2(x, y)\}^2$ indicates the square of the difference between the pixel value P1(x, y) in the coordinate(x, y) of the first image and the pixel value P2(x, y) in the coordinate(X, Y) of the second image,
wherein the sum of $\{P1(x, y)-P2(x, y)\}^2$ indicates a sum obtained in each coordinate,
wherein x is a value that satisfies 0≤x<image width, and
wherein y is a value that satisfies 0≤y<image height.

10. The video signal receiving apparatus according to claim 1, further comprising a data management unit which manages data relating to the size adjustment amount of the second video determined by the arithmetic processing unit,
wherein the data management unit manages the size adjustment amount and broadcast station information of a transmission source of the first and second video signals in association with each other,
wherein the reception processing unit supplies the broadcast station information to the data management unit when receiving the first and second video signals,
wherein the data management unit supplies the size adjustment amount to the arithmetic processing unit when there is the size adjustment amount associated with the broadcast station information supplied from the reception processing unit, and
wherein the arithmetic processing unit determines the size adjustment amount supplied from the data management unit as the size adjustment amount of the second video.

11. The video signal receiving apparatus according to claim 10, wherein the arithmetic processing unit:
determines whether the size adjustment amount is appropriate by calculating a similarity degree between the second image adjusted using the size adjustment amount supplied from the data management unit and the first image, and
when determining that the size adjustment amount is not appropriate, performs the image size determination processing.

12. The video signal receiving apparatus according to claim 1, further comprising:
a first video decoding unit which decodes the first video signal to generate the first video;
a second video decoding unit which decodes the second video signal to generate the second video; and
a target image determining unit which determines a target image to be subjected to the image size determination processing using at least one of a quantization parameter and decoding error information supplied from the first and second video decoding units.

13. The video signal receiving apparatus according to claim 12, wherein the target image determining unit determines the first and second images in which the quantization parameter is smaller than a predetermined threshold value as the target image.

14. The video signal receiving apparatus according to claim 12, wherein the target image determining unit excludes the first and second images in which the decoding error information indicates an error from the target image.

15. A video signal receiving apparatus comprising:
a reception processing unit which receives a first video signal for transmitting a same video content with a first aspect ratio and a second video signal for transmitting the same video content with a second aspect ratio different from the first aspect ratio respectively;
a first video adjustment unit which adjusts a size of a first video included in the first video signal;
a second video adjustment unit which adjusts a size of a second video included in the second video signal; and
an arithmetic processing unit which performs image size determination processing for determining a size adjustment amount of the second video adjusted by the second video adjustment unit,
wherein the second video adjustment unit performs scaling processing for reducing or enlarging a second image included in the second video signal to generate a scaling image, and performs shift processing for shifting the second image in a horizontal or vertical direction to generate a shift image,
wherein the arithmetic processing unit:
calculates a similarity degree between a first image included in the first video signal and the scaling image, and calculates a similarity degree between the first image and the shift image; and
uses the scaling image or the shift image having the higher calculated similarity degree as an image to be subjected to a next scaling processing and a next shift processing in the second video adjusting unit,
wherein the arithmetic processing unit:
divides the first and second images into a predetermined number of image regions;
calculates similarity degrees of the first and second images in each of the divided image regions;
determines the image region having the lowest calculated similarity degree among the divided image regions as a target image region; and
performs the image size determination processing on the determined target image region.

16. The video signal receiving apparatus according to claim 15, wherein the arithmetic processing unit:
determines the size adjustment amount of the second video by performing the image size determination processing on the target image region,
after determining the size adjustment amount of the second video, adjusts the second image before division using the determined size adjustment amount, and verifies the size adjustment amount by calculating a similarity degree between the adjusted second image and the first image.

17. A video signal receiving method comprising:
receiving a first video signal for transmitting a same video content with a first aspect ratio and a second video signal for transmitting the same video content with a second aspect ratio different from the first aspect ratio respectively;
adjusting a size of a first video included in the first video signal; and
performing image size determination processing for determining a size adjustment amount of a second video included in the second video signal,
wherein the performing the image size determination processing comprising:
performing scaling processing for reducing or enlarging a second image included in the second video signal to generate a scaling image;

performing shift processing for shifting the second image in a horizontal or vertical direction to generate a shift image;

calculating a similarity degree between a first image included in the first video signal and the scaling image;

calculating a similarity degree between the first image and the shift image; and using the scaling image or the shift image having the higher calculated similarity degree as an image to be subjected to a next scaling processing and a next shift processing, wherein the performing the image size determination processing further comprising:

setting the higher of the similarity degree between the first image and the scaling image and the similarity degree between the first image and the shift image to a maximum value of the similarity degree; and if the higher of a similarity degree between a scaling image obtained by performing the next scaling processing and the first image and a similarity degree between a shift image obtained by performing the next shift processing and the first image is lower than the set maximum value of the similarity degree, determining a scaling amount and a shift amount of the scaling image or the shift image having the higher similarity degree as the size adjustment amount of the second video, wherein the video signal receiving method further comprising adjusting the size of the second video using the determined size adjustment amount of the second video.

18. The video signal receiving method according to claim 17, wherein the first image and the second image are time synchronized images.

* * * * *